United States Patent
Matsumoto

(10) Patent No.: US 7,379,214 B2
(45) Date of Patent: May 27, 2008

(54) IMAGE PROCESSING APPARATUS CAPABLE OF PROCESSING IMAGE EMBEDDED WITH DIGITAL WATERMARK, METHOD FOR CONTROLLING THE IMAGE PROCESSING APPARATUS, AND STORAGE MEDIUM STORING PROGRAM TO EXECUTE THE METHOD

(75) Inventor: Atsushi Matsumoto, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/567,861

(22) Filed: Dec. 7, 2006

(65) Prior Publication Data

US 2007/0177762 A1    Aug. 2, 2007

(30) Foreign Application Priority Data

Dec. 7, 2005    (JP) ............................. 2005-353756

(51) Int. Cl.
G06K 15/00 (2006.01)
H04N 1/40 (2006.01)

(52) U.S. Cl. .................................................. 358/3.28
(58) Field of Classification Search ............... 358/3.28; 382/100
See application file for complete search history.

(56) References Cited

U.S. PATENT DOCUMENTS

| | | | |
|---|---|---|---|
| 5,912,974 A | 6/1999 | Holloway et al. | |
| 6,748,533 B1 | 6/2004 | Wu et al. | |
| 6,869,023 B2 * | 3/2005 | Hawes | 235/494 |
| 6,970,259 B1 * | 11/2005 | Lunt et al. | 358/1.14 |
| 7,034,951 B1 * | 4/2006 | Jones et al. | 358/1.12 |
| 7,190,480 B2 * | 3/2007 | Sturgeon et al. | 358/1.17 |
| 2004/0145661 A1 * | 7/2004 | Murakami et al. | 348/222.1 |
| 2005/0069171 A1 * | 3/2005 | Rhoads et al. | 382/100 |
| 2005/0152006 A1 * | 7/2005 | Abe et al. | 358/3.28 |
| 2006/0028693 A1 * | 2/2006 | Kagawa | 358/403 |
| 2007/0019244 A1 * | 1/2007 | Rekiere | 358/3.28 |

FOREIGN PATENT DOCUMENTS

| | | |
|---|---|---|
| EP | 0 676 877 A2 | 10/1995 |
| JP | 10-228470 A | 8/1998 |
| JP | 2003-051932 A | 2/2003 |
| WO | 00/39953 A1 | 7/2000 |

* cited by examiner

*Primary Examiner*—Vu Le
*Assistant Examiner*—Fan Zhang
(74) *Attorney, Agent, or Firm*—Canon USA. Inc. IP Division

(57) ABSTRACT

An image processing apparatus includes a feature value generating unit configured to generate a feature value of an image of a first page; and an embedding unit configured to embed the feature value of the image of the first page generated by the feature value generating unit in an image of a second page, which is different from the first page.

18 Claims, 23 Drawing Sheets

EMBED FEATURE VALUE
IN PREVIOUS PAGE

EMBED FEATURE VALUE
IN NEXT PAGE

EMBED FEATURE VALUE
IN PREVIOUS AND NEXT PAGES

← EMBED WATERMARK
TO DETECT FALSIFICATION

IMAGE PROCESSING APPARATUS CAPABLE OF PROCESSING IMAGE EMBEDDED WITH DIGITAL WATERMARK, METHOD FOR CONTROLLING THE IMAGE PROCESSING APPARATUS, AND STORAGE MEDIUM STORING PROGRAM TO EXECUTE THE METHOD

BACKGROUND OF THE INVENTION

1. Field of the Invention

The present invention relates to an image processing apparatus and an image processing method for adding information to detect falsification to document image data, and a medium storing a program executing a method for controlling the image processing apparatus.

2. Description of the Related Art

Nowadays, information security techniques to protect electronic data have been developed and applied on a daily basis.

For example, as disclosed in Patent Document 1 (Japanese Patent Laid-Open No. 2003-051932), a technique of detecting abuse of a copyrighted specific image (e.g., a character image) has been known. This technique is based on an environment where, every time electronic data is created by using a specific image, a copyright notice mark is embedded in a predetermined area outside an area where the specific image exists. If electronic data including a specific image does not have a copyright notice mark in the predetermined area, the electronic data is determined to be unauthorized. In Patent Document 1, the predetermined area is defined as an area having a predetermined position relationship with an area where a specific image exists. Also, according to Patent Document 1, the predetermined area may be placed in the same page as the specific image or in a different page.

The information security technique is also applied to a paper document, having merits of high visibility and easy handling.

For example, a feature value embedding technique of generating a feature value (e.g., hash value) from a paper document and embedding the generated feature value in the paper document has been known. This technique is used to detect falsification in a paper document.

Also, a page sort technique disclosed in Patent Document 2 (Japanese Patent Laid-Open No. 10-228470) has been suggested for a paper document, although this technique is not the information security technique. In the technique disclosed in Patent Document 2, page numbers are embedded in respective pages by watermarks. When a user processes a paper document embedded with page numbers on a copying machine, the copying machine extracts watermarks from the respective pages and recognizes respective page numbers. Then, the copying machine sorts the pages on the basis of the recognized page numbers and outputs a copy sorted in orderly sequence from a first page.

However, even if a paper document including a plurality of pages is created by embedding a feature value of each page in the page by using the feature value embedding technique, the paper document can be easily falsified and the falsification cannot be detected. For example, if someone discards one of the pages of the paper document, the fact that the page has been discarded cannot be established. Also, if someone creates a page and adds it to the paper document or replaces a page in the document with the created page, the fact that the page has been added or replaced cannot be established. That is, in this feature value embedding technique, the originality of each page can be proved, but the originality of the entire paper document including a plurality of pages cannot be proved.

Furthermore, even if a paper document including a plurality of pages is created by embedding watermarks in the respective pages by using the technique described in Patent Document 2, this paper document can be easily falsified and the falsification cannot be detected. For example, if someone rewrites an area that is not embedded with a watermark, the fact of the rewrite cannot be established.

Also, if a document is created by embedding a copyright mark in each page by using the technique described in Patent Document 1, this document can be easily falsified and the falsification cannot be detected. For example, if someone rewrites an area outside a specific image and the copyright mark, the fact of the rewrite cannot be established.

Under these circumstances, an image processing apparatus capable of creating an originality-guaranteed document including a plurality of pages or capable of guaranteeing the originality of a document including a plurality of pages has been required.

Herein, "falsification" means rewrite, replacement, pilferage, and so on. The "originality" means "authenticity". An "originality-guaranteed document" means a document that is guaranteed of not being falsified.

SUMMARY OF THE INVENTION

An image processing apparatus according to an aspect of the present invention includes a feature value generating unit configured to generate a feature value of an image of a first page; and an embedding unit configured to embed the feature value of the image of the first page generated by the feature value generating unit in an image of a second page, which is different from the first page.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Hereinafter, an embodiment of the present invention is described with reference to the drawings.

Figure 1:
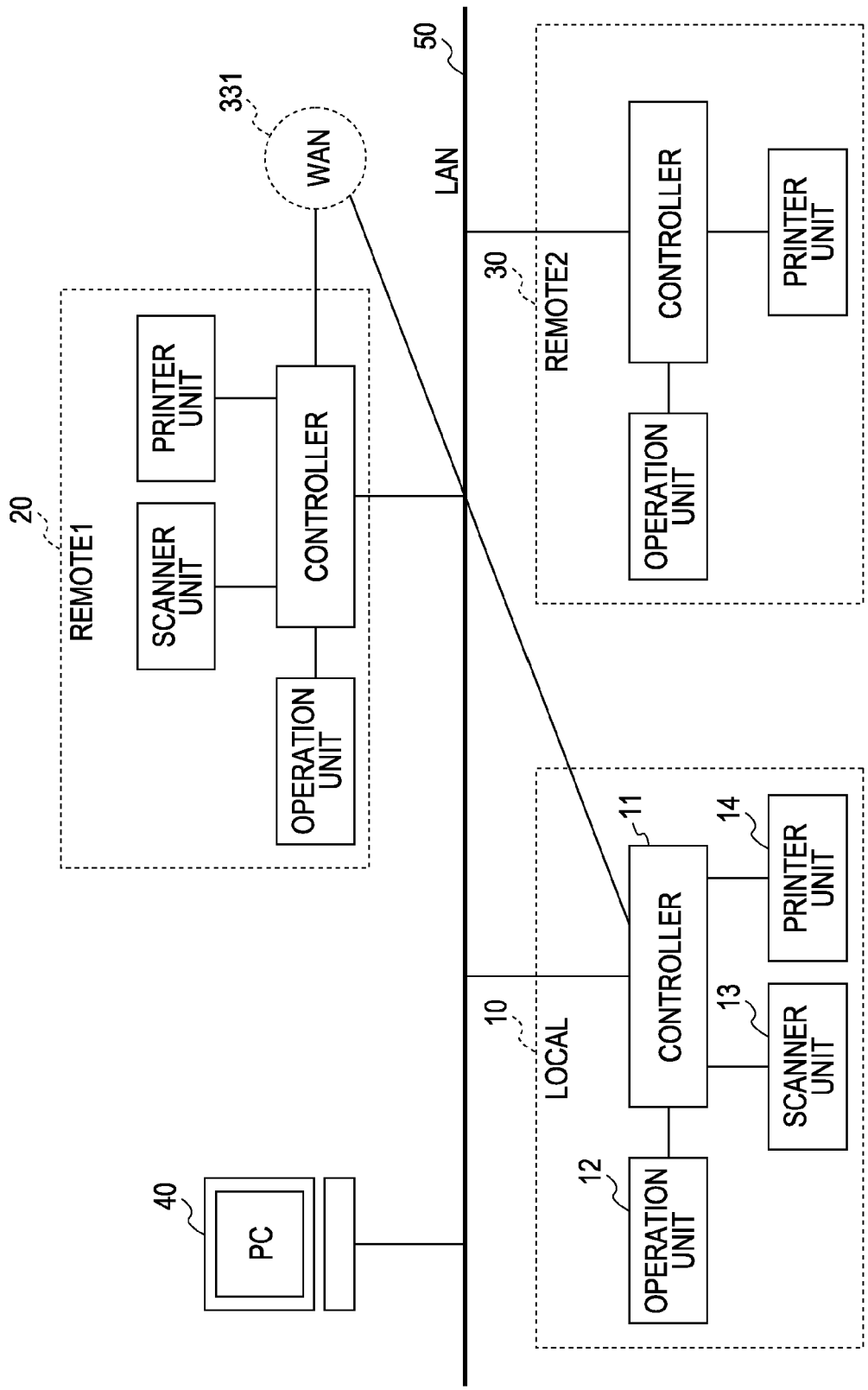
FIG. 1 shows a block diagram of an image processing system according to an embodiment of the present invention.

FIG. 1 is a block diagram showing a configuration of a printing system according to an embodiment of the present invention. In this system, a host computer 40 and three image forming apparatuses 10, 20, and 30 connect to a LAN (local area network) 50. The LAN is used for connection in this embodiment, but the present invention is not limited to use of the LAN. For example, another type of network including a WAN (wide area network), a serial transmission method including a USB (universal serial bus), and a parallel transmission method including Centronics and SCSI (small computer system interface), can also be applied.

The host computer (hereinafter referred to as a PC (personal computer)) 40 has a function of a PC. The PC 40 is capable of transmitting/receiving files and e-mails through the LAN 50 or the WAN by using an FTP (fine transfer protocol) or SMB (server message block) protocol. Also, the PC 40 can output a print command to the image forming apparatuses 10, 20, and 30 via a printer driver.

The image forming apparatuses 10 and 20 have the same configuration. The image forming apparatus 30 has a printing function, but does not have a scanner unit, which is provided in the image forming apparatuses 10 and 20. Hereinafter, the configuration of the image forming apparatus 10 is described for convenience.

The image forming apparatus 10 includes a scanner unit 13 serving as an image input device; a printer unit 14 serving as an image output device; a controller 11 to control operations of the entire image forming apparatus 10; and an operation unit 12 serving as a user interface (UI).

<Image Forming Apparatus 10 (FIG. 2)>

Figure 2:
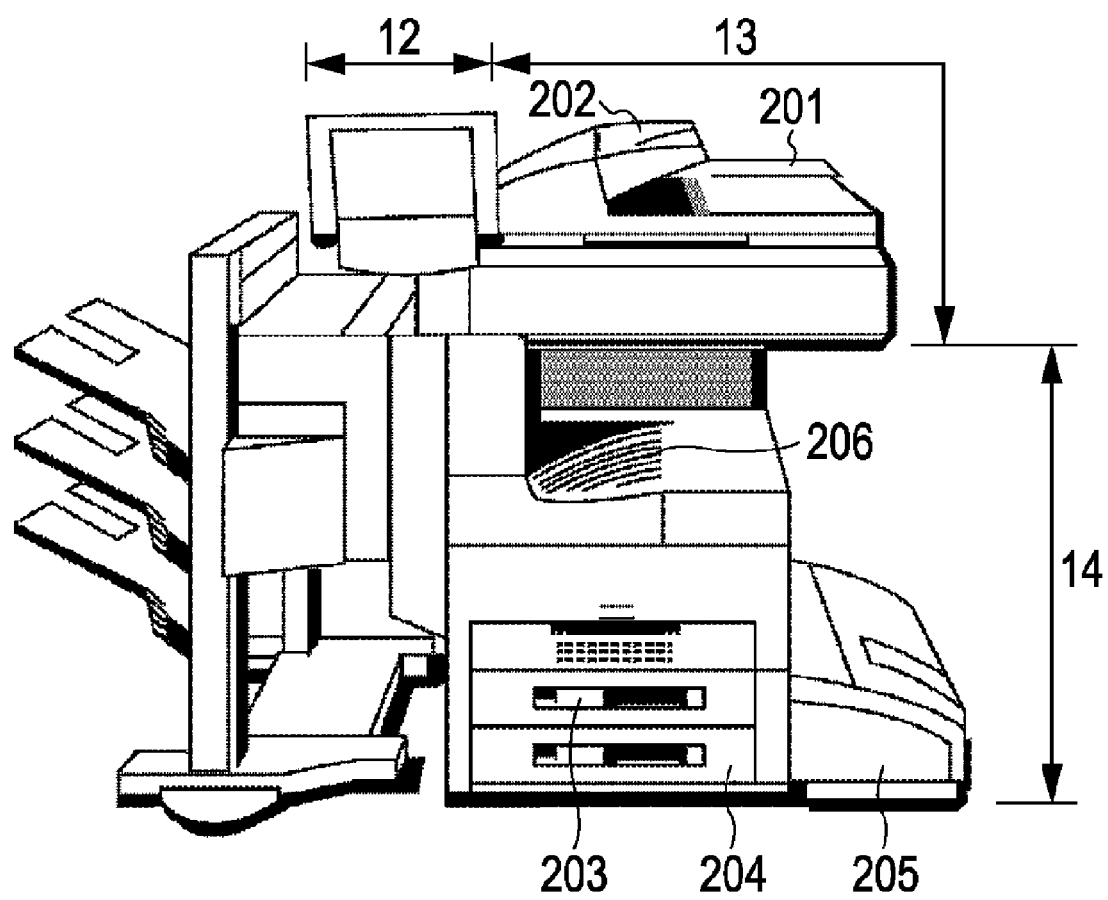
FIG. 2 shows an image forming apparatus according to an embodiment of the present invention.

FIG. 2 shows the appearance of the image forming apparatus 10. The scanner unit 13 inputs reflected light obtained through exposure scanning of an image on a document into a CCD (charge-coupled device), so as to convert image information to an electric signal. Also, the scanner unit 13 converts the electric signal to a luminance signal of RGB and outputs the luminance signal as image data to the controller 11.

A document is set on a tray 202 of a document feeder 201. When a user provides instructions to start reading from the operation unit 12, the controller 11 transmits a document reading command to the scanner unit 13. The scanner unit 13 receives this command and reads the document by feeding the document one sheet at a time from the tray 202 of the document feeder 201. The document may be read in an automatic feeding method using the document feeder 201, or may be scanned by placing the document on a document glass (not shown) and by moving an exposure unit.

The printer unit 14 is an image forming device to form image data received from the controller 11 on paper. In this embodiment, electrophotography using a photoconductive drum or a photoconductive belt is used as an image forming method, but the present invention is not limited to this method. For example, an inkjet method of ejecting ink from a minute nozzle array and printing the ink on paper can also be applied. The printer unit 14 is provided with a plurality of paper cassettes 203, 204, and 205 so that various paper sizes and paper orientations can be selected. Paper after printing is output to an output tray 206.

<Details of the Controller 11 (FIG. 3)>

Figure 3:
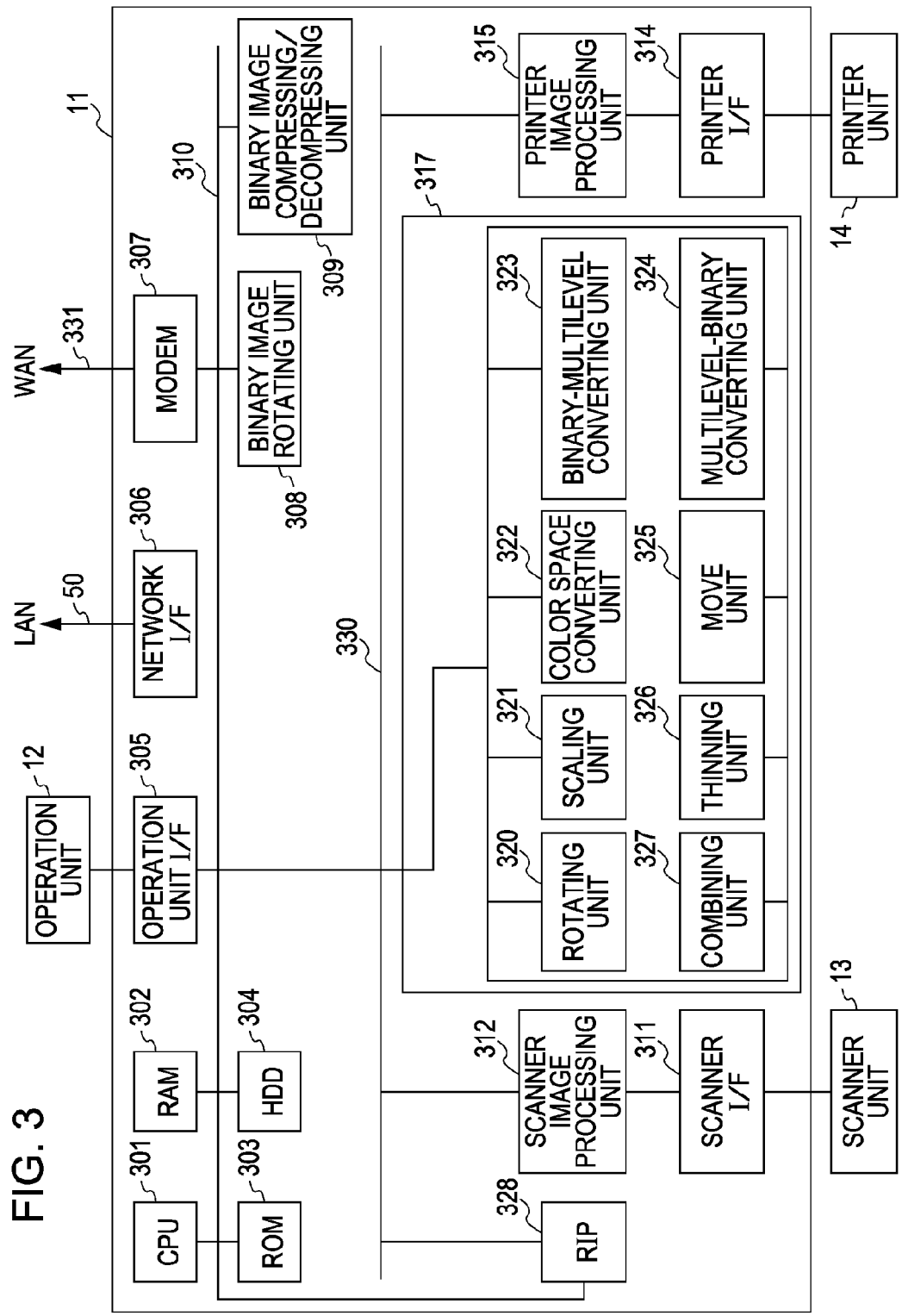
FIG. 3 shows an internal configuration of the image processing apparatus.

FIG. 3 is a block diagram specifically illustrating the configuration of the controller 11 of the image forming apparatus 10.

The controller 11 electrically connects to the scanner unit 13 and the printer unit 14, and also connects to the PC 40 and other external apparatuses through the LAN 50 or a WAN 331. With this configuration, image data and device information can be input/output.

A CPU (central processing unit) 301 comprehensively controls access with various connected devices on the basis of a control program or the like stored in a ROM (read only memory) 303 and also comprehensively controls various processes performed in the controller 11. A RAM (random access memory) 302 is a system work memory used by the CPU 301 to operate and also functions as a memory to temporarily store image data. The RAM 302 includes an SRAM (static RAM) to hold stored data even after power-off and a DRAM (dynamic RAM) where data stored therein is erased after power-off. The ROM 303 stores a boot program of the apparatus. An HDD 304 is a hard disk drive capable of storing system software and image data.

An operation unit I/F 305 is an interface unit to connect a system bus 310 to the operation unit 12. The operation unit I/F 305 receives image data to be displayed in the operation unit 12 from the system bus 310, outputs the image data to the operation unit 12, and outputs information received from the operation unit 12 to the system bus 310.

A network I/F 306 connects to the LAN 50 and the system bus 310 and inputs/outputs information. A modem 307 connects to the WAN 331 and the system bus 310 and inputs/outputs information. A binary image rotating unit 308 changes the orientation of image data before transmission. A binary image compressing/decompressing unit 309 changes the resolution of image data before transmission to a predetermined resolution or in accordance with the ability of a destination apparatus. A method such as JBIG (Joint Bi-level Image Experts Group), MMR (Modified Modified Read), MR (Modified Read), or MH (Modified Huffman) is used for compression/decompression. An image bus 330 is a transmission line to transmit/receive image data and includes a PCI (peripheral component interconnect) bus or IEEE1394.

A scanner image processing unit 312 corrects, processes, and edits image data received from the scanner unit 13 via a scanner I/F 311. Also, the scanner image processing unit 312 determines whether received image data is a color document or a monochrome document, or a text document or a photo document, and attaches the determination result to the image data. The attached information is called image area data. The process performed by the scammer image processing unit 312 is described in detail below.

A printer image processing unit 315 receives image data and processes the image data while referring to image area data attached to the image data. The processed image data is output to the printer unit 14 via a printer I/F 314. The process performed by the printer image processing unit 315 is described in detail below.

An image converting unit 317 performs predetermined conversion on image data and includes the following units.

A rotating unit 320 rotates received image data. A scaling unit 321 changes resolution of received image data (e.g., from 600 dpi to 200 dpi). A color space converting unit 322 converts a color space of received image data. The color space converting unit 322 performs a known light color removing process by using a matrix or a table, a known LOG converting process (RGB→CMY), and a known output color correcting process (CMY→CMYK). A binary-multilevel converting unit 323 converts received 2-level image data to 256-level image data. On the other hand, a multilevel-binary converting unit 324 converts received 256-level image data to 2-level image data by using an error diffusion method or the like.

A combining unit 327 combines received two image data so as to generate composite image data. Two image data are combined in the following method: a method of using an average of luminance values of pixels to be combined as a composite luminance value; or a method of using a luminance value of a pixel having a higher luminance level as a luminance value of a composite pixel. Alternatively, a luminance value of a pixel having a lower luminance level may be used as a luminance value of a composite pixel. Furthermore, a composite luminance value can be determined by OR, AND, or exclusive OR operation of pixels to be combined. Also, overwriting can be applied as a combining method. The overwriting is a combining method of adopting a luminance value and a density value of one of image data to be combined as a luminance value and a density value of composite image data. For example, if image data B is overwritten with image data A, the composite image data matches the image data A. If a predetermined area of image data D is overwritten with image data C, the luminance value and density value of a predetermined area of the composite image data match those of the image data C, and the luminance value and density value of the area other than the predetermined area match those of the image data D. Note that these combining methods are well known. A thinning unit 326 thins pixels of received image data so as to convert the resolution and generates half, quarter, or one-eighth image data. A move unit 325 attaches or deletes margins to/from received image data.

A RIP (raster image processor) 328 receives intermediate data that is transmitted from the PC 40 and that is generated on the basis of PDL (page description language) code data, and then generates (multilevel) bitmap data.

<Details of the Scanner Image Processing Unit 312 (FIG. 4)>

Figure 4:
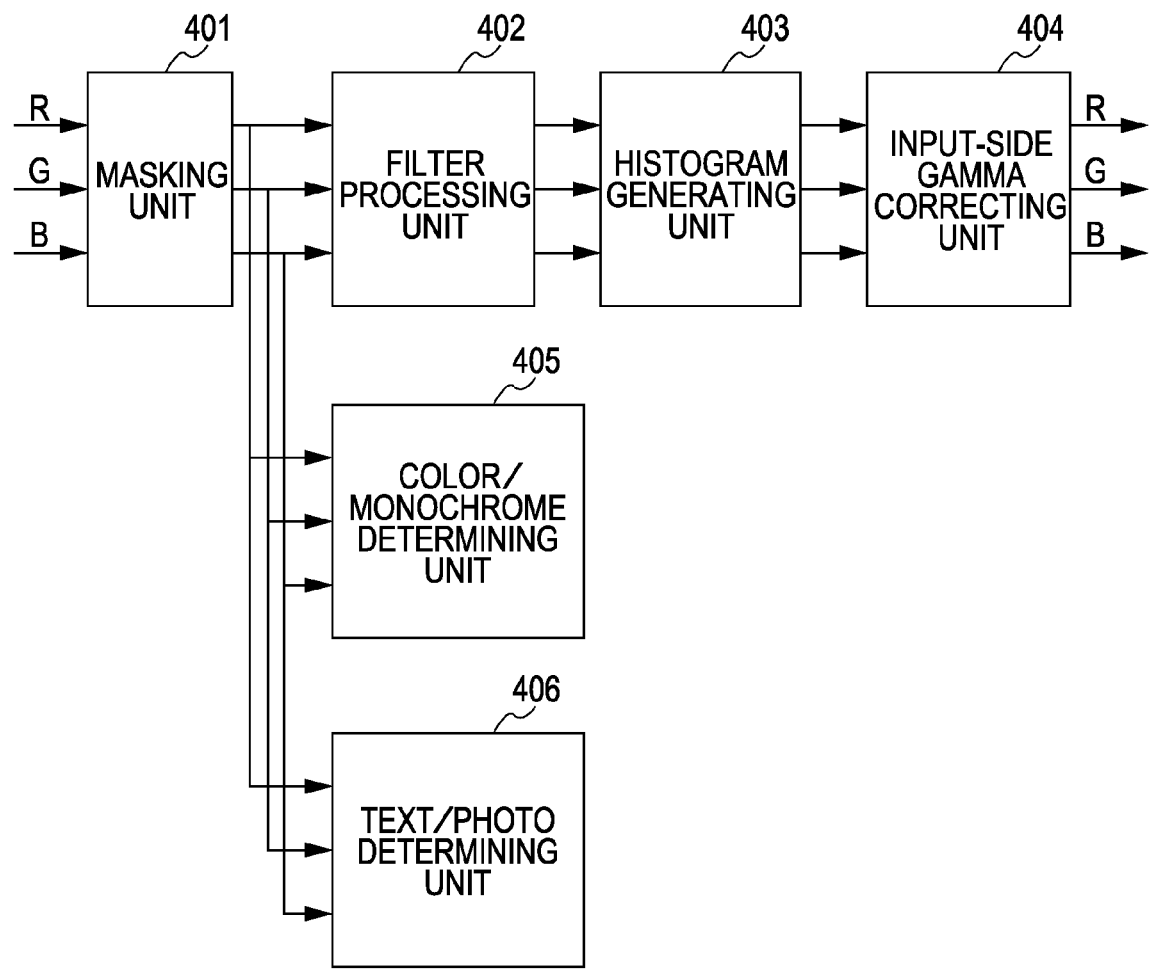
FIG. 4 is a processing block diagram showing a scanner image processing unit according to an embodiment of the present invention.

FIG. 4 shows an internal configuration of the scanner image processing unit 312.

The scanner image processing unit 312 receives image data including a luminance signal of RGB (each corresponding to 8 bits). The luminance signal is converted to a standard luminance signal that does not depend on a filter color of the CCD by a masking unit 401.

A filter processing unit 402 arbitrarily corrects a spatial frequency of received image data. This processing unit performs an operation using a 7×7 matrix on the received image data. Incidentally, in a copying machine or a multifunction apparatus, a text mode, a photo mode, or a text/photo mode can be selected as a copy mode by pressing a tab 604 shown in FIG. 6. If the text mode is selected by a user, the filter processing unit 402 applies a text filter on the entire image data. If the photo mode is selected, the filter processing unit 402 applies a photo filter on the entire image data. If the text/photo mode is selected, filters are adaptively switched in units of pixels in accordance with a text/photo determining signal (part of image area data), which is described below. That is, whether the photo filter or the text filter is applied is determined for each pixel. The photo filter is set with such a coefficient that only a high-frequency component is smoothed, so that roughness of an image becomes insignificant. On the other hand, the text filter is set with such a coefficient that edge reinforcement is strongly performed, so that characters are sharpened.

A histogram generating unit 403 samples luminance data of respective pixels constituting received image data. More specifically, the histogram generating unit 403 samples luminance data in a rectangular area, which is defined by a start point and an end point specified in a main scanning direction and a sub-scanning direction, at constant pitches in the main scanning direction and the sub-scanning direction. Then, the histogram generating unit 403 generates histogram data on the basis of a sampling result. The generated histogram data is used to estimate a background level when a light color removing process is performed. An input-side gamma correcting unit 404 converts received data to luminance data having a nonlinear characteristic by using a table or the like.

A color/monochrome determining unit 405 determines whether respective pixels constituting received image data are chromatic or achromatic, and attaches the determination result as a color/monochrome determining signal (part of image area data) to the image data. A text/photo determining unit 406 determines whether respective pixels constituting the image data correspond to a text part or other (e.g., photo part), and attaches the determination result as a text/photo determining signal (part of image area data) to the image data.

<Details of the Printer Image Processing Unit 315 (FIG. 5)>

Figure 5:
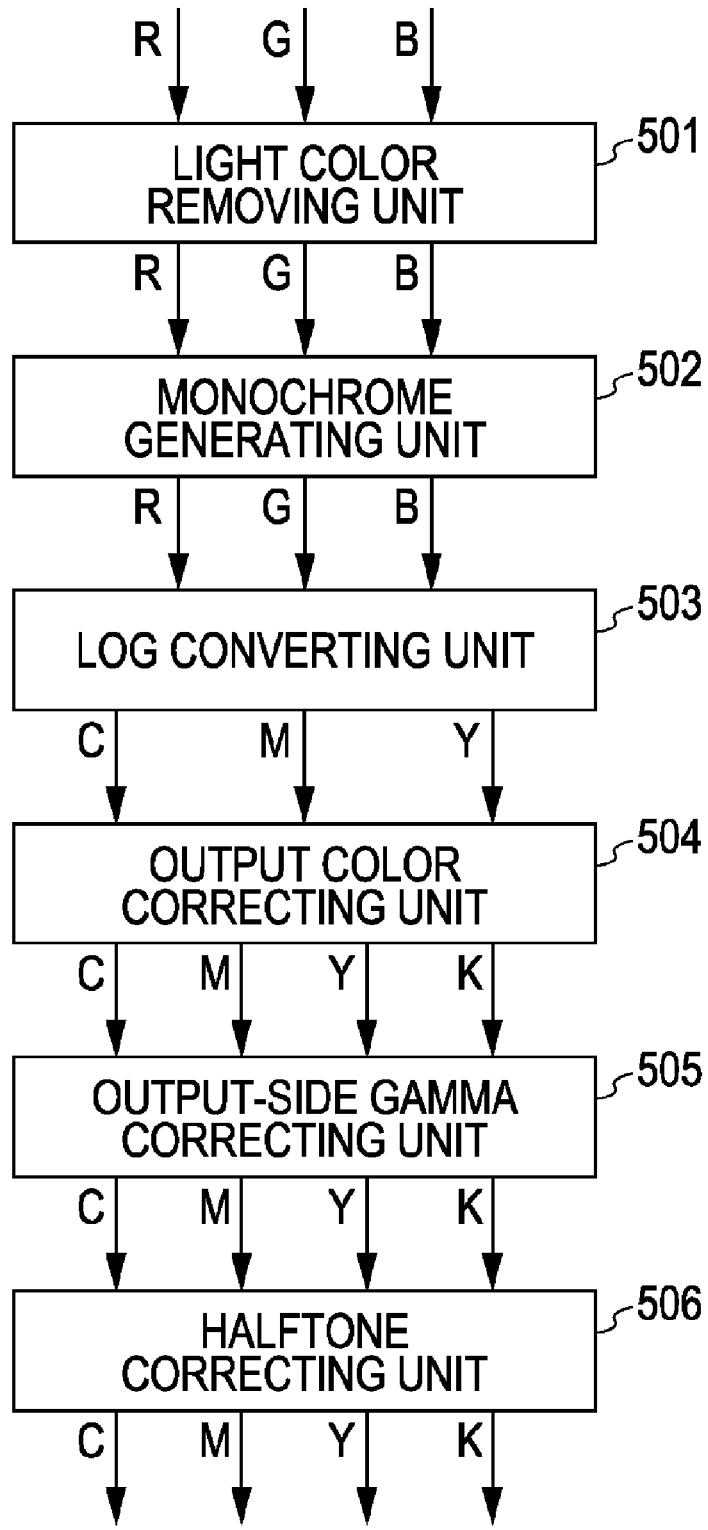
FIG. 5 is a processing block diagram showing a printer image processing unit according to an embodiment of the present invention.

FIG. 5 shows a process performed in the printer image processing unit 315.

A light color removing unit 501 removes a light color of image data by using the histogram generated by the scanner image processing unit 312. A monochrome generating unit 502 converts color data to monochrome data. A LOG converting unit 503 converts luminance and density. For example, the LOG converting unit 503 converts RGB image data to CMY image data. An output color correcting unit 504 corrects output colors. For example, the output color correcting unit 504 converts the CMY image data to CMYK image data by using a table or a matrix. An output-side gamma correcting unit 505 performs correction so that a signal value input to the output-side gamma correcting unit 505 is proportional to a reflection density value of an output copy. A halftone correcting unit 506 performs an arbitrary halftone process in accordance with the number of tones of the printer unit. For example, the halftone correcting unit 506 performs binarization or 32-valued processing on received image data of high gradation.

Each processing unit in the scanner image processing unit 312 and the printer image processing unit 315 can be allowed to output received image data without performing any process thereon. An effect of image processing on the image data can be reduced by setting a small coefficient in each process. The description about the controller 11 ends now.

<The Operation Screen>

Now, an operation screen is described with reference to FIG. 6.

Figure 6:
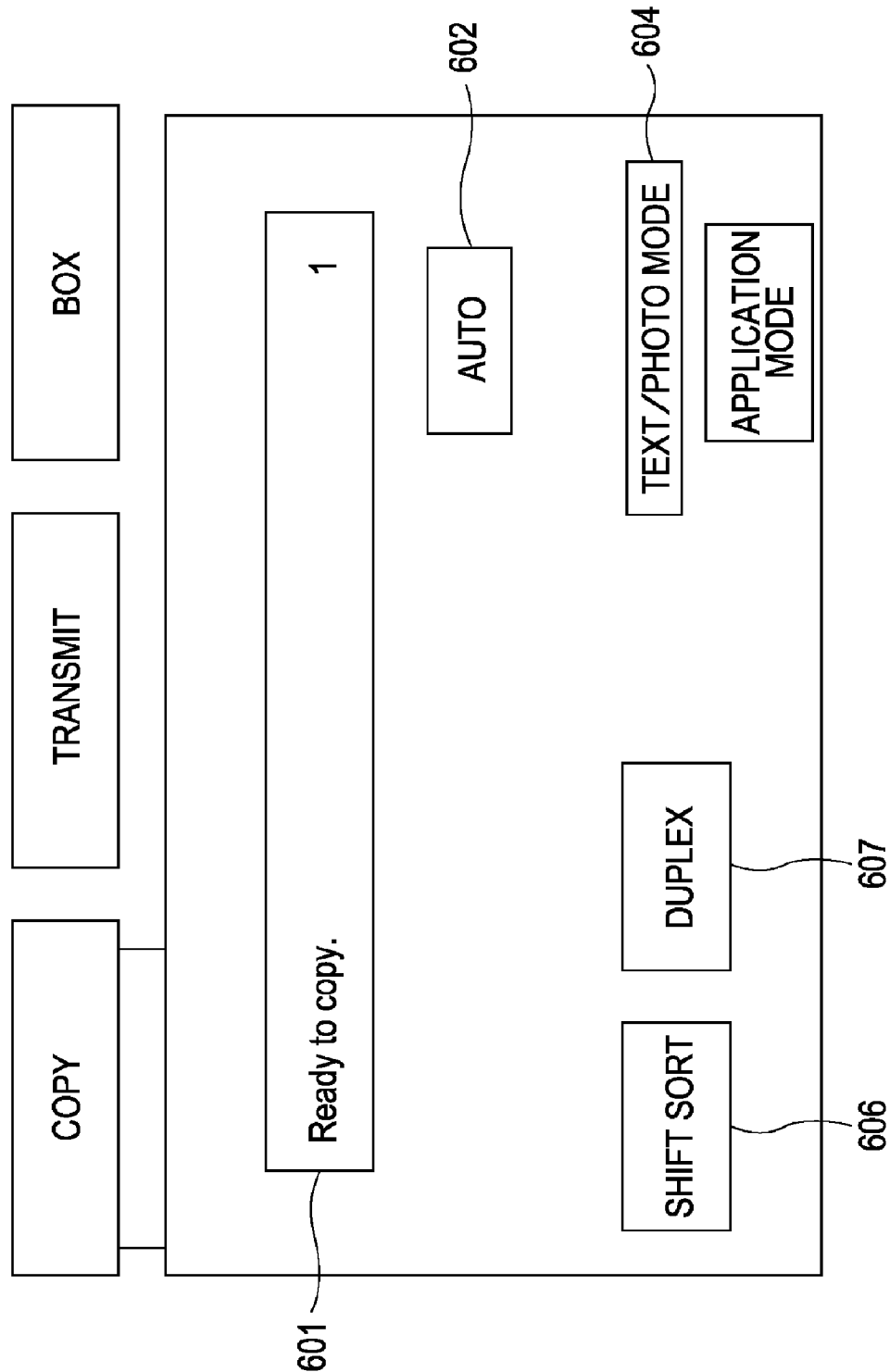
FIG. 6 shows example 1 of an operation screen.

FIG. 6 shows an initial screen in the image forming apparatus 10. An area 601 indicates whether the image forming apparatus 10 is ready to copy and the number of copies set. A document selecting tab 604 is used to select the type of document. When a user presses this tab, a selection menu including three modes: text mode; photo mode; and text/photo mode, is popped up. A finishing tab 606 is used to set various finishing processes. A duplex setting tab 607 is used to set duplex reading or duplex printing. A reading mode tab 602 is used to select a reading mode of a document. When a user presses this tab, a selection menu including three modes: color mode; black mode; and automatic mode (ACS), is popped up. Color copy is performed when the color mode is selected, whereas monochrome copy is performed when the black mode is selected. When the ACS mode is selected, the copy mode is determined on the basis of the above-described monochrome/color determining signal.

<Normal Copying Operation>

Now, a copying operation is described. A document read by the scanner unit 13 is supplied as image data to the scanner image processing unit 312 via the scanner I/F 311. The scanner image processing unit 312 performs the process shown in FIG. 4 on this image data so as to generate new image data and image area data and to attach the image area data to the image data. Then, the image data attached with the image area data is transmitted to the RAM 302 and is stored therein. Then, the image data stored in the RAM 302 is transmitted to the printer image processing unit 315. The printer image processing unit 315 edits the image data in accordance with the image area data attached thereto. This process corresponds to the process shown in FIG. 5. The image data that has been edited by the printer image processing unit 315 is transmitted to the printer unit 14 via the printer I/F 314. Finally, the printer unit 14 forms an image on paper to be output.

Incidentally, the editing method performed in each processing unit of the scanner image processing unit 312 and the printer image processing unit 315, that is, the editing method performed in each processing unit shown in FIGS. 4 and 5, can be changed by switching a register. The register is switched in accordance with the image area data or setting information (by a user) from the operation unit 12. Although not described above, a process stored in the ROM 303 or the HDD 304 or a process of taking image data stored in the ROM 303 or the HDD 304 may be performed.

<Normal PDL Printing Operation>

Now, a PDL printing operation is described. PDL data transmitted from the PC 40 through the LAN 50 is transmitted to the RAM 302 via the network I/F 306 and is stored therein. The PDL data stored in the RAM 302 is interpreted, so that intermediate data is generated. The intermediate data is transmitted to the RIP 328. The RIP 328 renders the intermediate data so as to generate image data of a raster format. Then, the generated image data is transmitted to the RAM 302 and is stored therein.

Then the image data is read from the RAM 302. This image data is attached with image area data corresponding to object data (data indicating whether the image data is a text image or a photo image) included in the PDL data. When instructions to perform PDL printing are provided, this image data is transmitted to the printer unit 14 and the image thereof is formed on paper. This operation is the same as the copying operation and thus the description thereof is omitted.

<Guarantee of Originality of Document>

Hereinafter, a process of printing an originality-guaranteed document including a plurality of pages, and a process of detecting whether the printed document is the original are described.

First, when an originality-guaranteed document is to be printed out, a feature value of each page in the document is embedded in a different page, so as to generate a document in which the feature value of each page is embedded in the different page. Then, the generated document is printed. Hereinafter, an output in which the originality is guaranteed is called "originality-guaranteed output", and an output in which the originality is not guaranteed is called "normal output".

Apparatus to read a document by a scanner and determine whether the read document is the original is provided. This apparatus is called a detecting apparatus in this embodiment. The detecting apparatus generates a feature value from image data of each page constituting the read document, obtains a feature value embedded in a different page, and compares the two feature values. If the feature values are equal to each other in all pages, the detecting apparatus determines that the document is the original. If the feature values are not equal to each other in a page, the detecting apparatus determines that the document is not the original. Hereinafter, this determining process is called an originality determining process.

First, a process of generating an originality-guaranteed output is described in detail.

<Process of Generating Originality-Guaranteed Output>

Figure 7:
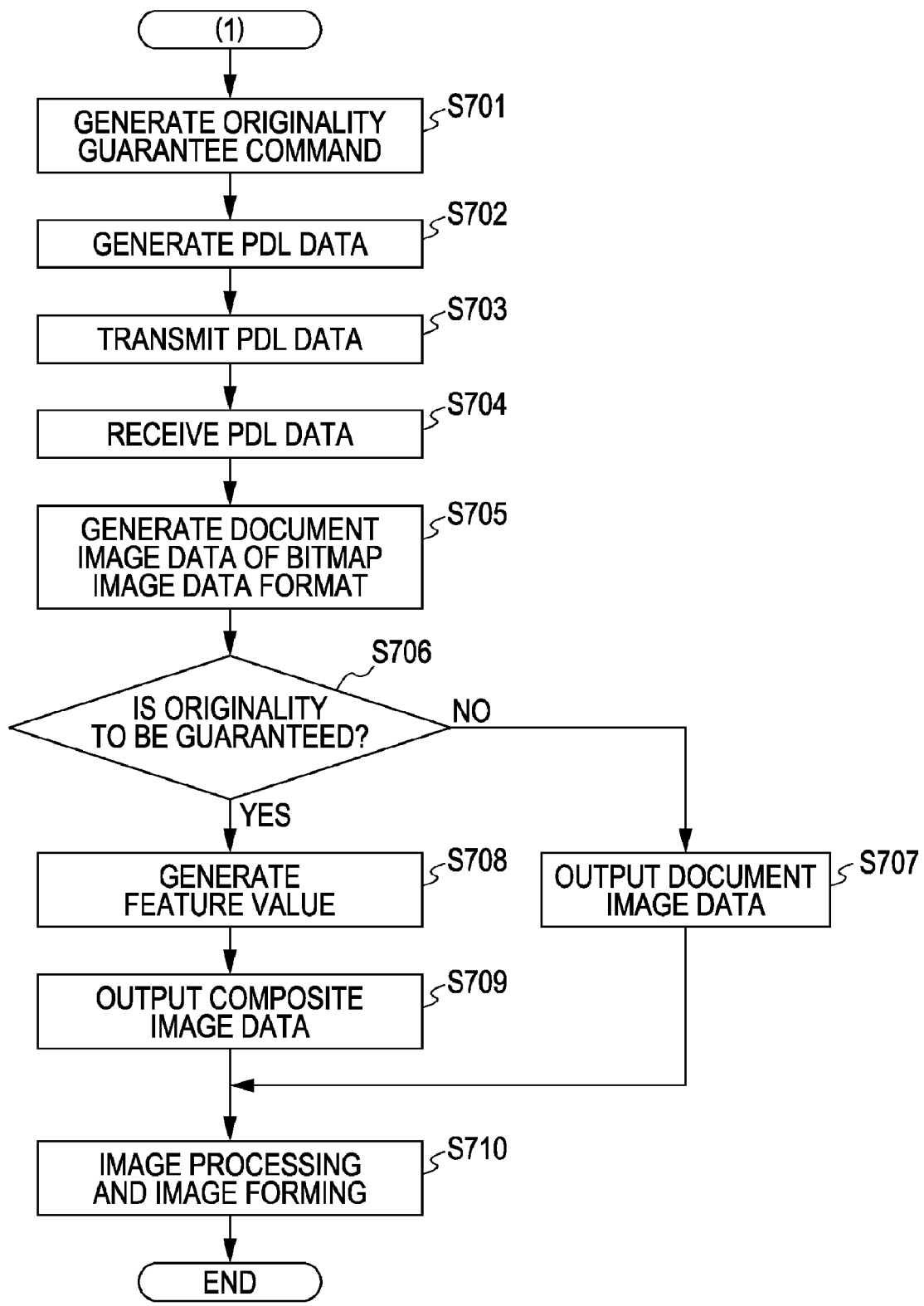
FIG. 7 is a flowchart showing a PDL process.

The flowchart shown in FIG. 7 shows a process of generating an originality-guaranteed output according to this embodiment of the present invention. The process performed in the host computer 40 (steps S701 to S703) is comprehensively controlled by a CPU of the host computer 40. The process performed in the image forming apparatus 10 (steps S704 to S710) is comprehensively controlled by the CPU 301 of the image forming apparatus 10.

First, a user selects "guarantee the originality" or "not guarantee the originality" on the operation screen (not shown) via the operation unit of the host computer 40. Also, the user provides instructions to print a document including a plurality of pages. In response to the instructions, the following process starts.

In step S701, the host computer 40 accepts the above-described selection and generates an originality guarantee command.

In step S702, the host computer 40 generates PDL data on the basis of the originality guarantee command and the document data.

In step S703, the host computer 40 transmits the PDL data to the image forming apparatus 10 through the LAN 50.

In step S704, the image forming apparatus 10 receives the PDL data and stores it in the RAM 302.

In step S705, the PDL data is read from the RAM 302 and is transmitted to the RIP 328. The RIP 328 performs a rendering process on the PDL data so as to generate document image data of a bitmap image data format. This document image data is stored in the RAM 302.

In step S706, it is determined whether the originality is to be guaranteed on the basis of the originality guarantee command included in the PDL data. If the originality is to be guaranteed, the process proceeds to step S708. If the originality is not to be guaranteed, the process proceeds to step S707.

In step S707, the document image data stored in the RAM 302 is transmitted to the printer image processing unit 315 and the process proceeds to step S710.

In step S708, feature values of respective pages of the document image data are generated and the generated feature values are embedded in different pages. That is, the feature value of page x ($1 \leq x \leq n$, wherein n is the total number of pages of the document image data) is embedded in page y ($x \neq y$). This process is described in detail below.

In step S709, the document image data embedded with the feature values in step S708 is transmitted to the printer image processing unit 315, and the process proceeds to step S710.

In step S710, the printer image processing unit 315 performs image processing on the received document image data. The processed document image data is transmitted to the printer unit 14 via the printer I/F 314. Then, the printer unit 14 outputs the received document image data on sheets of paper. This process is described in detail below.

The above description is based on the assumption that the document is a PDL document. However, the present invention is not limited to this, but the document may be a copy document. In that case, the following steps are performed instead of steps S701 to S705 shown in FIG. 7.

First, the user selects whether the originality is to be guaranteed on the operation screen (not shown) via the operation unit 12 of the image forming apparatus 10. Also, the user puts a document to be copied on a document table and provides instructions to copy.

Then, the CPU 301 receives the instructions, generates an originality guarantee command, and stores it in the RAM 302. Document image data that has been generated by reading a document in the scanner unit 13 is transmitted to the scanner image processing unit 312 via the scanner I/F 311. The scanner image processing unit 312 performs image processing on the document image data. The processed document image data is stored in the RAM 302.

In the above description, the data is stored in the RAM 302. However, the data may be stored in the ROM 303 or the HDD 304 instead of in the RAM 302 or as necessary. This is the same in this embodiment and the other embodiments.

<Details of Step S708>

Figure 8:
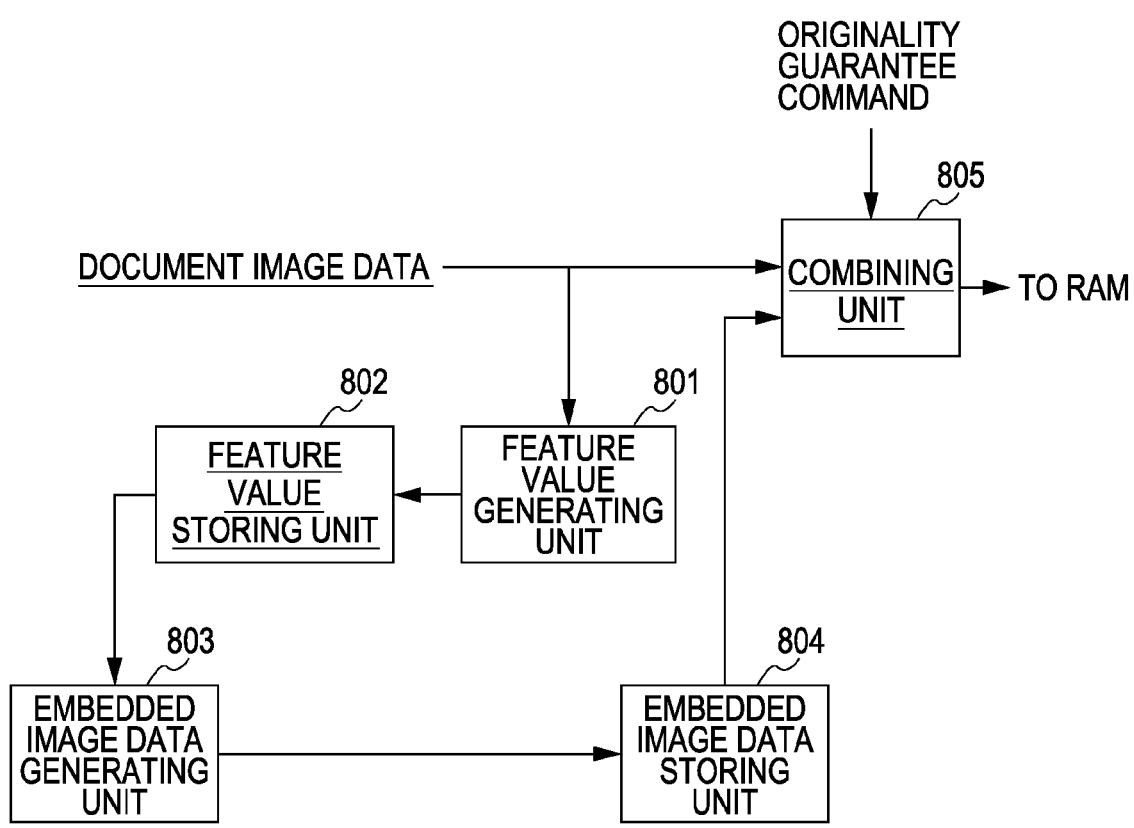
FIG. 8 shows processing example 1 of step S708.

The block diagram shown in FIG. 8 shows the details of step S708. A process performed by each processing unit shown in FIG. 8 is performed when the CPU 301 executes the software stored in the ROM 303. However, the present invention is not limited to this. For example, each process can be performed by hardware specializing in execution of the process. This is the same in the other embodiments.

The document image data is stored in the RAM 302 in a bitmap data format, as described above. If the document image data is stored in the RAM 302 in a format other than the bitmap data format for some reasons, the CPU 301 converts the format to the bitmap data format. This is the same in the other embodiments.

Referring to FIG. 8, the processing units include a feature value generating unit 801, a feature value storing unit 802, an embedded image data generating unit 803, an embedded image data storing unit 804, a combining unit 805.

<Feature Value Generating Unit 801 . . . Step S708>

The feature value generating unit 801 selects each page of the document image data stored in the RAM 302. The selection is made in the order of, for example, page 1, page 2, . . . , and page n (last page). However, the selecting order is not limited to this, but another order may also be adopted. For example, the pages may be selected in the order of page n, . . . , page 2, and page 1. Each of the selected pages is called a "selected page". Image data of a page is called "page image data".

The feature value generating unit 801 obtains information indicating an area of the selected page from which a feature value should be generated. This area is called a "feature value generation area". The feature value generation area is desirably fixed in any document image data or any image forming apparatus. This is because the detecting apparatus can easily generate a feature value from the feature value generation area of each page. If the feature value generation area is at the same position in any document image data or any apparatus, the detecting apparatus does not need to search for a feature value generation area every time.

Also, the feature value generating unit 801 generates a feature value of a selected page on the basis of the document image data in the feature value generation area of the selected page. After generating the feature value of the selected page, the feature value generating unit 801 transmits the feature value to the feature value storing unit 802. Then, the feature value generating unit 801 selects a next page and generates a feature value of the selected page. The feature value generating unit 801 repeats this process until completing generation of a feature value of the last page.

Herein, the feature value includes character string data existing in a feature value generation area, character code, font, and size constituting the character string, or combination of these data. However, the present invention is not limited to this, but any data existing in the feature value generation area can be used as a feature value. For example, whole or part of text in the feature value generation area can be used as a feature value. Also, if important information such as an amount of money, name, or address is described in the document, only a character string indicating the important information may be used as a feature value. Also, a feature calculated from a figure in the feature value generation area may be used as a feature value. The feature calculated from an image includes, for example, a scaled-down image or a hash value in the feature value generation area.

Then, the feature value generating unit 801 determines a page to be embedded with the feature value of the selected page (image data in a page to which the feature value of the selected page is to be combined by the combining unit 805). Hereinafter, the determined page is called an "embedding target page". Note that the embedding target page needs to be different from the selected page.

Figure 9A:
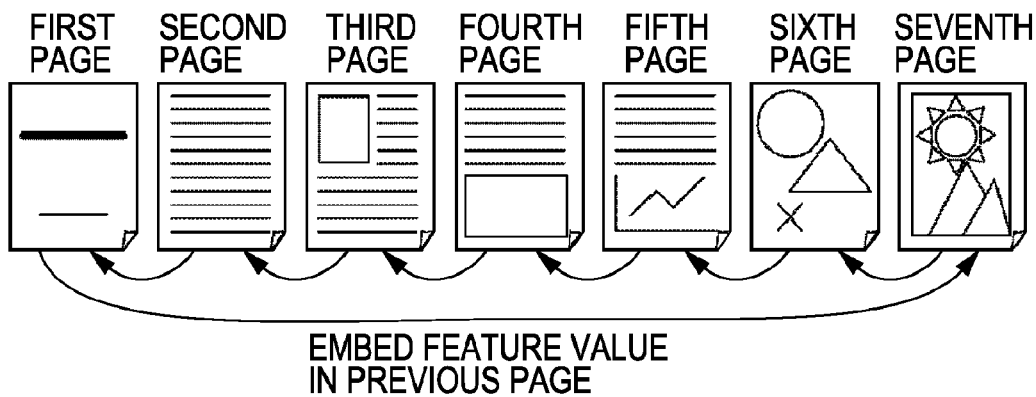
FIG. 9A shows a process of embedding a feature value in a previous page.
Figure 9B:
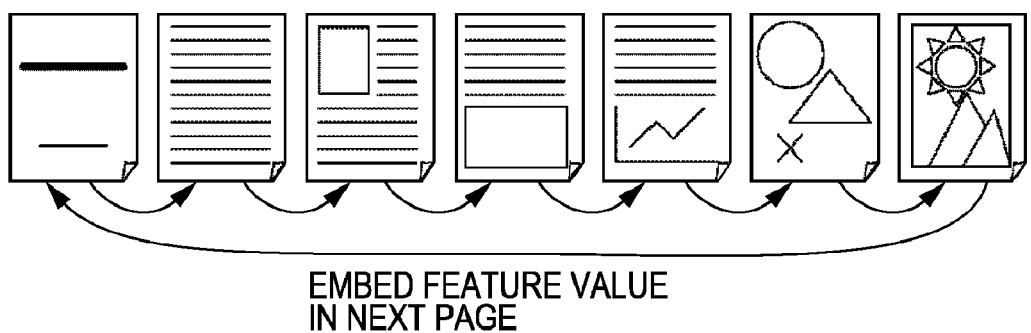
FIG. 9B shows a process of embedding a feature value in a next page.
Figure 9C:
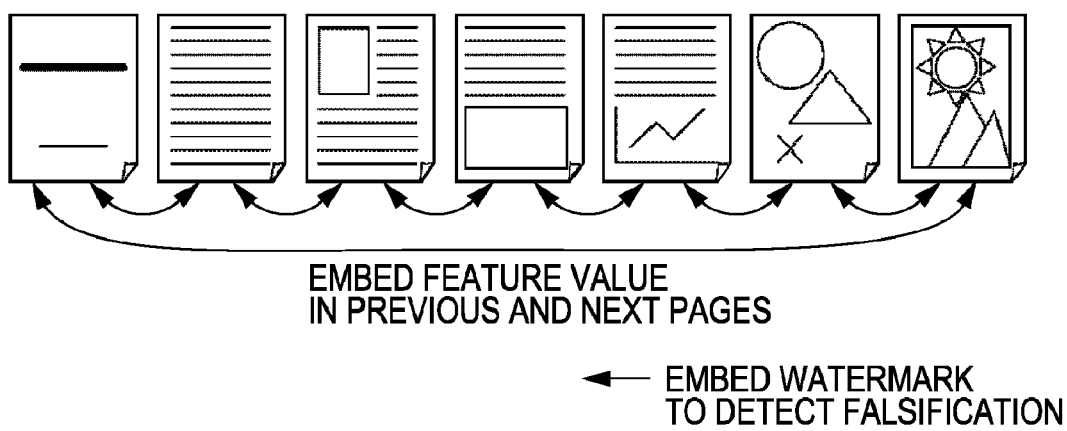
FIG. 9C shows a process of embedding a feature value in both a previous and a next page.

FIG. 9B conceptually shows a case where a selected page is k and an embedding target page is k+1. FIG. 9A conceptually shows a case where a selected page is k and an embedding target page is k−1. FIG. 9C conceptually shows a case where a selected page is k and an embedding target page is k−1 and k+1. When the feature value of a selected page is to be embedded in an adjacent page, the following problem arises. That is, when the first page (or the last page) is selected, a page to be embedded with the feature value of the selected page does not exist. In order to avoid this problem, the following method is adopted in this embodiment. That is, when the first page is selected, the feature value thereof is embedded in the last page. When the last page is selected, the feature value thereof is embedded in the first page (see FIGS. 9A to 9C).

<Feature Value Storing Unit 802 . . . Step S708>

Then, the feature value storing unit 802 stores the feature value generated by the feature value generating unit 801 in the RAM 302.

<Embedded Image Data Generating Unit 803 . . . Step S708>

Then, the embedded image data generating unit 803 receives the feature value stored in the RAM 302 and generates embedded image data on the basis of the feature value. The embedded image data includes various visible patterns, such as a barcode, and a watermark that is difficult to be recognized by human eyes.

<Embedded Image Data Storing Unit 804 . . . Step S708>

Then, the embedded image data storing unit 804 stores the embedded image data generated by the embedded image data generating unit 803 in the RAM 302.

<Combining Unit 805 . . . Step S708>

The combining unit 805 reads image data of an embedding target page in the document image data stored in the RAM 302 and the embedded image data (image data including the feature value generated from the selected page) stored in the RAM 302. Then, the combining unit 805 embeds the embedded image data in a predetermined area of the image data of the embedding target page, so as to generate composite image data. Then, the combining unit 805 stores the composite image data in the RAM 302. In this embodiment, the predetermined area is called an embedding target area.

As described below, the detecting apparatus generates a feature value from a feature value generation area of a target page and obtains a feature value by extracting it from image data embedded in the target page. Then, the detecting apparatus compares the two feature values so as to perform an originality guarantee determining process. The detecting apparatus that performs the originality guarantee determining process needs to generate a feature value that is equal to the feature value generated by an apparatus to generate an originality-guaranteed output. Thus, the feature value generation area is desirably set as the same area in each apparatus. Alternatively, information may be transmitted among respective apparatuses through the LAN 50 so that the feature value generation area is set the same in each apparatus. However, a method for transmitting information indicating a feature value generation area is not limited. For example, information indicating a feature value generation area may be included in embedded image data.

Also, the feature value generation area is desirably different from the embedding target area. This is because, if embedded image data is combined into the feature value generation area of a selected page, the image data in the feature value generation area changes. If the image data in the feature value generation area changes, the feature value generated from the selected page by the detecting apparatus becomes different from the feature value that is already embedded in the embedding target page. As a result, a false determination occurs in an originality determining process performed by the detecting apparatus (a process of determining originality by comparing two feature values).

The feature value generation area may include a plurality of segments. This is the same for the embedding target area.

If the embedded image data is a transparent watermark that is difficult to be recognized by human eyes, the feature value generation area may be partly overlapped with the embedding target area. This is because, if a transparent watermark is embedded in the feature value generation area of target image data, the image data in the feature value generation area hardly changes. In this embodiment, a feature value of a selected page is generated before a feature value of another page is embedded in the selected page. However, if a transparent watermark is used, the processing order can be changed. For example, after a feature value of another page has been embedded in a selected page, a feature value may be generated from the selected page embedded with the feature value of the other page. This is also because, if a transparent watermark is embedded in the feature value generation area of target image data, the image data in the feature value generation area hardly changes. Of course, if embedding a transparent watermark causes a change of the feature value generation area of image data and a change of the feature value of the image, the transparent watermark should not be embedded in the feature value generation area.

According to the above description, embedded image data and document image data are stored in the RAM 302 (RAM 302, ROM 303, or HDD 304), but a description about deleting data is not given. However, when the document image data includes many pages, a large-capacity storage unit is required to store both data. Thus, unnecessary data should be sequentially deleted.

For example, when a selected page is k and when an embedding target page is k+1, as in FIG. 9B, the image data of the selected page is unnecessary after a feature value of the selected page has been generated. Thus, the image data of the selected page is deleted at this time. Also, after embedded image data has been combined into image data of an embedding target page, the embedded image data becomes unnecessary. Thus, the embedded image data is deleted at this time. Due to these deleting operations, a storage unit such as the RAM 302 does not need to have a large capacity.

In FIG. 9B, page 1 is an embedding target page when page n is selected. In this case, a combining process to page 1 cannot be performed until a feature value of page n is generated. For a user who wants to print an originality-guaranteed output in order from page 1, page n may be selected first and a feature value of page n may be generated. More specifically, in this embodiment, the feature value generating unit 801 selects pages in the order of page n, page 1, page 2, . . . , and page n−1. In this configuration, page n is selected first, so that a feature value to be embedded in page 1 is generated first. As a result, printing out can be performed in order from page 1.

Some users may want to print an originality-guaranteed output as quickly as possible regardless of a page order. In order to satisfy the needs of those users, the feature value generating unit 801 may select pages in the order of page 1, page 2, . . . , and page n. Then, feature values of the pages are embedded in corresponding pages in the order of page 2, page 3, . . . , page n, and page 1. Accordingly, the originality-guaranteed output can be obtained without waiting for the reading of page n, so that the processing speed increases.

<Details of Step S709>

As described above with reference to FIG. 5, the printer image processing unit 315 performs a light color removing process, an output-side gamma correcting process, and a halftone correcting process. Thus, composite image data generated by the combining unit 805 can be changed. If the composite image data is changed, image data embedded in the composite image data that has been input to the printer image processing unit 315 can become unrecognizable by the detecting apparatus. Furthermore, even if the embedded image data is recognizable, the data can be wrongly recognized as information different from actual information. In order to prevent these problems, the embedded image data generating unit 803 generates highly-resistant embedded image data, and composite image data is generated on the basis of the embedded image data. Alternatively, a small coefficient may be used in image processing performed by the printer image processing unit 315 so that an effect of the image processing on composite image data is small. In another solving method, after a halftone correcting process has been performed on document image data, the process of step S708 (feature value extracting process and combining process) may be performed on the document image data. When the combining process is performed in the last stage, the process is performed in the following manner. That is, the printer image processing unit 315 performs image processing on the document image data before step S708, and various processes are performed on the processed document image data in step S708 so that composite image data is generated. Then, the composite image data is output in step S709, and image formation is performed without image processing in step S710.

The description about a method for generating an originality-guaranteed output ends now.

Although not described above in the description about the embedded image data generating unit 803, the embedded image data generating unit 803 can encrypt data (e.g. the feature value in this embodiment) to be included in embedded image data. The encryption is performed by using a secret key that is usable only in the image forming apparatus 10. In such encryption, a public key corresponding to the secret key needs to be transmitted to an apparatus capable of detecting the originality (hereinafter called a detecting apparatus). The public key may be transmitted to the detecting apparatus from the image forming apparatus 10 through the LAN or WAN. Alternatively, the public key may be obtained on a network. Encryption and decryption may be performed by the same key (common key).

According to the above description, the processes in the respective processing units shown in FIG. 8 are performed when the CPU 301 executes the software stored in the ROM 303. However, the present invention is not limited to this, but the processes can be performed by hardware specializing in the respective processes. For example, the process performed by the combining unit 805 may be performed by the combining unit 327. Of course, in that case, document image data and embedded image data stored in the RAM 302 are transmitted to the combining unit 327, which combines the both data. Then, the generated composite image data is transmitted to the RAM 302 and is stored therein.

According to the above description, steps S706 and S708 are performed by the image forming apparatus 10. However, the present invention is not limited to this arrangement, for example any other apparatuses can perform steps S706 and S708 on document image data stored in a predetermined storage device. In particular, information processing apparatuses including the host computer 40 and a server (not shown) can perform those steps.

<Process Performed by the Detecting Apparatus>

As describe above, the detecting apparatus generates a feature value on the basis of image data of respective pages constituting a read document, obtains a feature value of the respective pages embedded in other pages, and compares the two feature values. If the two feature values are equal to each other, the detecting apparatus determines that the document is the original. Otherwise, the detecting apparatus determines that the document is not the original. Hereinafter, the process performed by the detecting apparatus is described.

The following description is made on the assumption that the detecting apparatus is the image forming apparatus 10, but the present invention is not limited to this. For example, the image forming apparatus 20, the image forming apparatus 30 that does not have a reading unit, or the host computer 40 may perform various detecting processes. Note that, however, if the image forming apparatus 30 that does not have a reading unit or the host computer 40 performs the following process, the apparatus needs to receive document image data generated on the basis of a document read by a reading unit.

<Details of Process Performed by the Detecting Apparatus>

Figure 11:
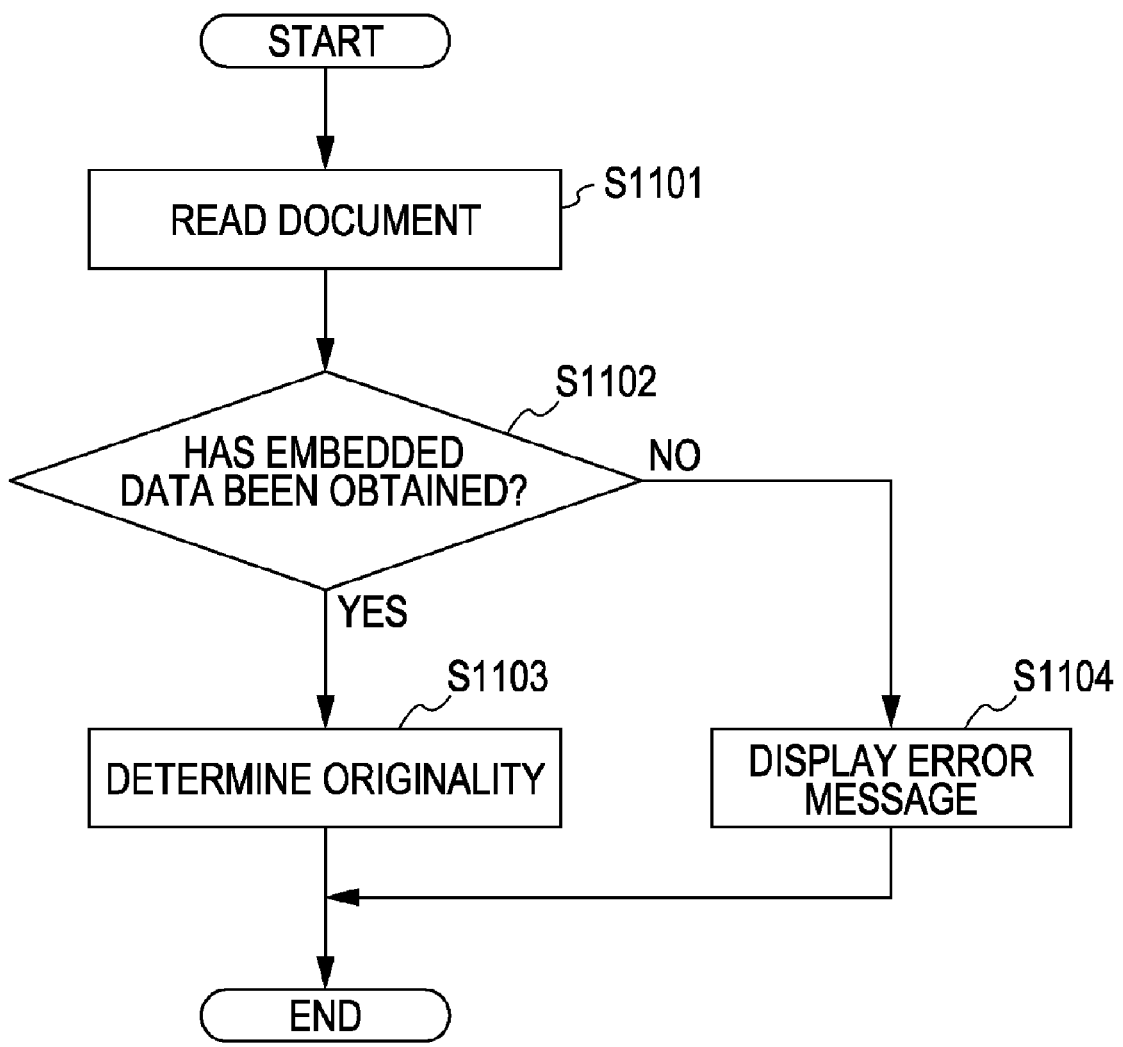
FIG. 11 shows example 1 of a process performed by a detecting apparatus.

The flowchart shown in FIG. 11 shows a process performed by the detecting apparatus according to this embodiment of the present invention.

First, a user selects whether an originality determining process is to be performed on the operation screen (not shown) via the operation unit 12 of the image forming apparatus 10. Then, the user sets a document on the document table and provides instructions to start the originality determining process.

In step S1101, the document is read by the scanner unit 13, and document image data is transmitted to the scanner image processing unit 312 via the scanner I/F 311. The scanner image processing unit 312 performs the image processing shown in FIG. 4 on the document image data, and the document image data is transmitted to the RAM 302 and is stored therein. The processed document image data is stored in the RAM 302 in a bitmap image data format. If the document image data is stored in the RAM 302 in a format other than the bitmap image data format for some reasons (e.g., if the document image data is stored while being compressed), the CPU 301 converts the format to the bitmap image data format. Then, the process proceeds to step S1102.

In step S1102, it is determined whether an embedded image exists in each page of the document image data. If it is determined that an embedded image exists, it is determined whether a feature value can be extracted from the embedded image. If an embedded image exists and if a feature value can be extracted from the embedded image, the feature value is extracted and is stored in the RAM 302. Then, the process proceeds to step S1103. On the other hand, if an embedded image does not exist or if a feature value cannot be extracted, the process proceeds to step S1104. If the feature value included in the embedded image is encrypted, the feature value needs to be decrypted in step S1102. If decryption cannot be performed, the process proceeds to step S1104.

In step S1104, a message saying that embedded information (feature value) cannot be obtained from the read document is displayed on the screen.

Figure 12:
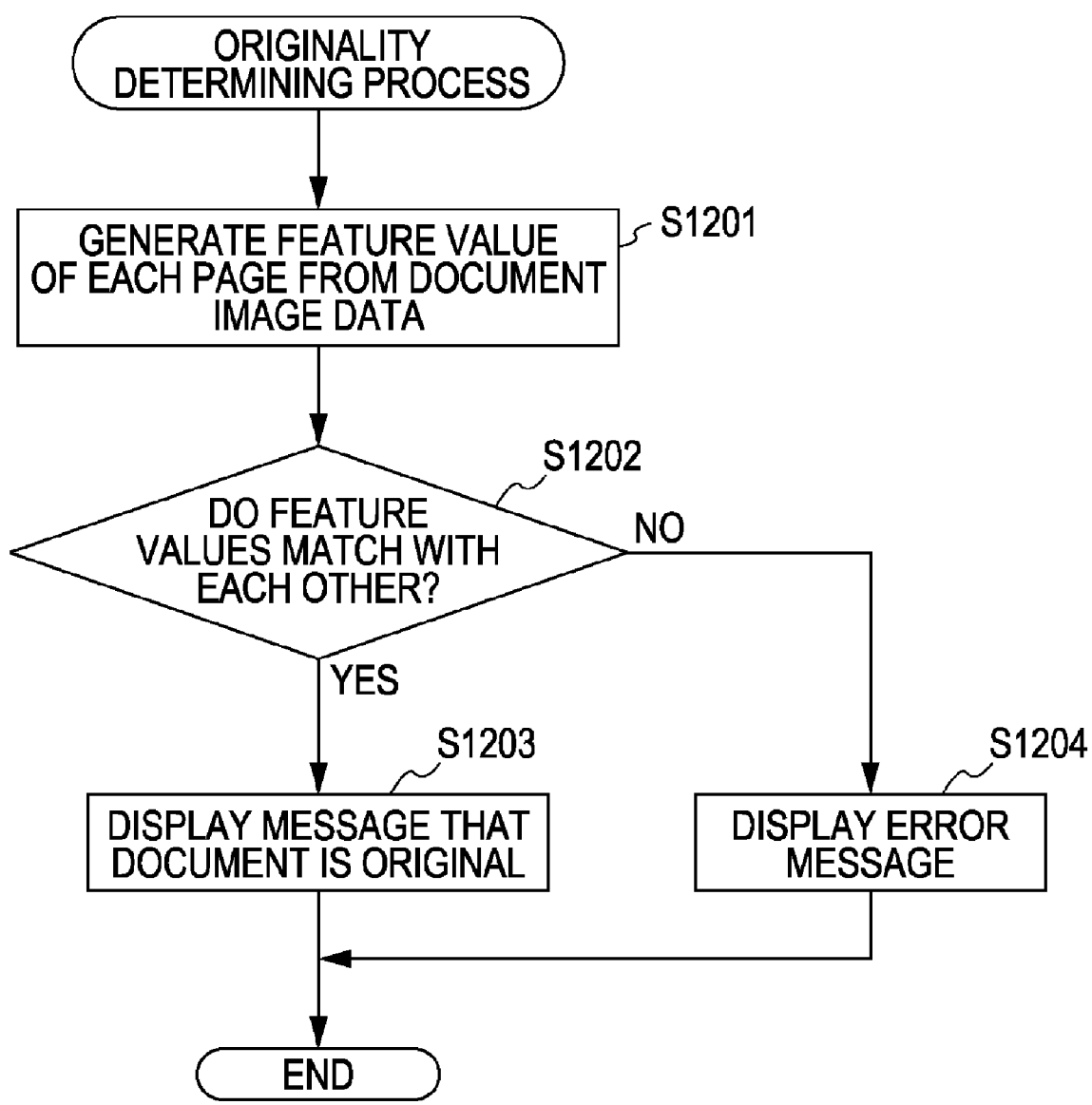
FIG. 12 shows details of an originality determining process.

In step S1103, an originality determining process is performed. The flowchart shown in FIG. 12 shows the originality determining process according to this embodiment of the present invention.

First, in step S1201, a feature value is generated from a feature value generation area of each page of the document image data in the same method as that performed in the feature value generating unit 801, and the generated feature value is stored in the RAM 302.

Then, in step S1202, the feature value obtained in step S1102 is compared with the feature value generated in step S1201, and it is determined whether both feature values match with each other. If the feature values match with each other for all pages, the process proceeds to step S1203. On the other hand, if the feature values do not match with each other in at least one of the pages, the process proceeds to step S1204.

In step S1203, a message saying that the read document is the original is displayed on the operation screen of the operation unit 12.

In step S1204, an error message saying that the read document is not the original is displayed on the operation screen of the operation unit 12. For example, a message "There is a possibility that the document has been falsified." is displayed.

In the above-described configuration, whether the document is the original is determined in step S1202 in response to the instructions from the user to perform the originality determining process, and the determination result is displayed in step S1203 or S1204. However, the determination result need not always be displayed. For example, the document may be copied only if the document has been determined to be the original. In the detecting apparatus having such a configuration, whether a document is the original can be determined, and also an original document can be easily copied advantageously. This configuration in which a document is copied only after being determined to be the original so as to generate a copy can be applied to the other embodiments.

In the above-described configuration, the originality determining process is performed only if the instructions to perform the originality determining process are provided from the user, but the present invention is not limited to this. For example, the originality determining process may be performed on a document every time instructions to copy the document are provided to the image forming apparatus, such as a copying machine. In the detecting apparatus having such a configuration, whether a document is the original can be automatically notified to the user who has provided instructions to copy the document. Accordingly, even if the user provides instructions to copy without knowing that the document is not the original, the user can be notified that the document is not the original.

In the above-described step S1202, the document is determined to have originality if the generated feature value matches the obtained feature value in all pages. However, the present invention is not limited to the method of comparing the feature values after the feature values of all pages have been obtained and generated. For example, every time a feature value is generated (or obtained), the feature value may be compared with an already obtained (or already generated) feature value. In that configuration, a falsified page can be quickly found. This configuration of comparing feature values in real time can also be applied to the other embodiments.

In the above-described step S1204, an error message saying that the read document is not the original is displayed, but the present invention is not limited to this error message. For example, information indicating a falsified page can be displayed. If information indicating a falsified page is to be displayed, it is not sufficient that the generated feature value of all pages is compared with the obtained feature value of all pages. That is, not only a process of determining originality by comparing feature values in all pages, but also a process of determining whether the feature values match with each other in each page needs to be performed. The configuration in which not only a determination result of originality but also a falsified page are displayed can be applied to the other embodiments.

The detailed description about the process performed by the detecting apparatus ends now.

According to the above-described first embodiment, a document including a plurality of pages, the originality of which can being guaranteed in each page, can be generated. Also, whether a document is the original can be determined.

Second Embodiment

In a second embodiment, an originality-guaranteed output is generated by allowing embedded image data to include not only a feature value but also other diverse information. The detecting apparatus performs various forms of determining process and output process on a read document on the basis of the diverse information. The various forms of determining process include the originality determining process described above in the first embodiment.

<Process of Generating Originality-Guaranteed Output>

The flowchart shown in FIG. 7 shows the process of generating an originality-guaranteed output. The respective steps of the flowchart shown in FIG. 7 have been described above except step S708. Hereinafter, details of step S708 are described.

<Details of Step S708>

Figure 10:
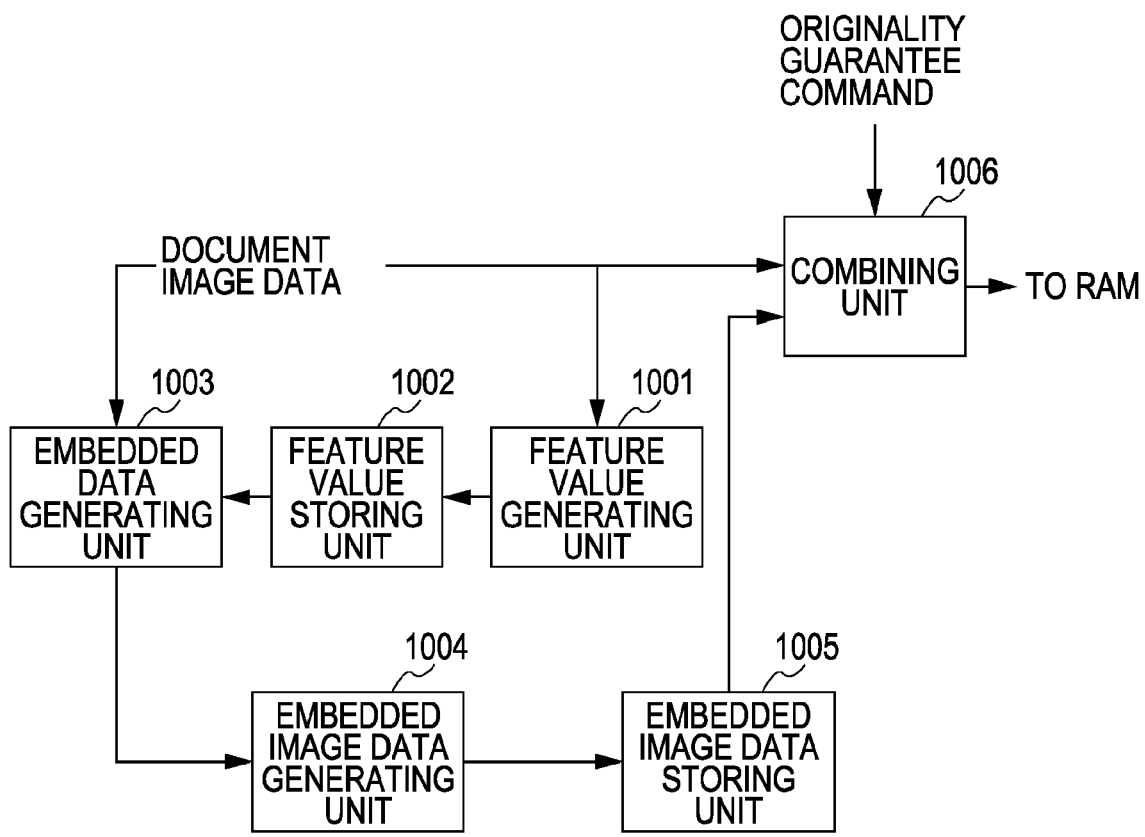
FIG. 10 shows processing example 2 of step S708.

The block diagram shown in FIG. 10 shows the details of step S708 according to this embodiment of the present invention. In FIG. 10, processing units include a feature value generating unit 1001, a feature value storing unit 1002, an embedded data generating unit 1003, an embedded image data generating unit 1004, an embedded image data storing unit 1005, and a combining unit 1006. The processes performed in the feature value generating unit 1001, the feature value storing unit 1002, the embedded image data storing unit 1005, and the combining unit 1006 are the same as those in the first embodiment, that is, the processes performed in the feature value generating unit 801, the feature value storing unit 802, the embedded image data storing unit 804, and the combining unit 805 according to the first embodiment. Thus, processes performed in the embedded data generating unit 1003 and the embedded image data generating unit 1004 are described below.

The embedded data generating unit 1003 generates a document ID. The document ID is a unique ID and is generated for each document including a plurality of pages. When a plurality of copies of a document including a plurality of pages are to be output, a unique ID is generated for each copy. An example of the document ID includes a character string generated on the basis of a serial number or the image forming apparatus 10 and date/time of output. The serial number of the image forming apparatus 10 is stored in the ROM 303. Thus, the serial number needs to be read from the ROM 303.

The embedded data generating unit 1003 obtains a total number of pages from the document image data.

Also, the embedded data generating unit 1003 generates embedded data including the number of a selected page, the number of an embedding target page, the total number of pages, the document ID, and the feature value stored in the RAM 302.

Then, the embedded image data generating unit 1004 receives the embedded data and generates embedded image data including the embedded data. The embedded image data is a visible pattern or a watermark, as in the first embodiment.

As described above, in the second embodiment, unlike in the first embodiment, embedded image data includes not only a feature value but also the number of a selected page, the number of an embedding target page, a total number of pages, and a document ID.

Then, as in the first embodiment, the generated embedded image data is combined with the document image data so that an originality-guaranteed output is generated.

The description about the method for generating an originality-guaranteed output ends.

<Process Performed by the Detecting Apparatus>

Hereinafter, details of the process performed by the detecting apparatus are described.

The detecting apparatus is capable of performing the originality determining process described in the first embodiment, a falsification-in-specified-page determining process, a full document determining process, a page-sort output process, and so on.

Herein, the falsification-in-specified-page determining process is a process of determining whether a page specified by a user is falsified. The full document determining process is a process of determining whether a document includes all pages. The page-sort output process is a process of putting out-of-order pages of a read document in correct order and outputting the document. In the page-sort output process, a plurality of types of documents can be sorted at the same time and output.

The following description is made on the assumption that the detecting apparatus is the image forming apparatus 10, but the present invention is not limited to this. For example, the image forming apparatus 20 having the same configuration as that of the image forming apparatus 10, the image forming apparatus 30 that does not have a reading unit, or the host computer 40 can perform various detecting processes. Note that, if the image forming apparatus 30 that does not have a reading unit or the host computer 40 performs the following processes, the apparatus needs to receive document image data generated on the basis of a document read by a reading unit.

<Screen for Setting Process Performed by the detecting Apparatus>

Before describing a specific process performed by the detecting apparatus, an operation screen is described.

Figure 13:
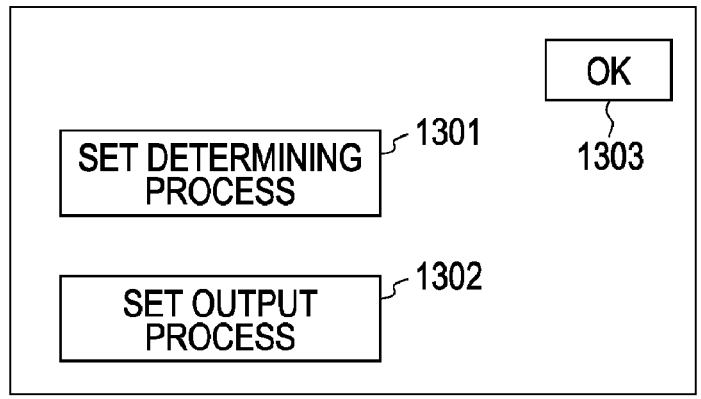
FIG. 13 shows example 2 of the operation screen.

FIG. 13 shows an operation screen used by a user to perform settings. On this operation screen, various determining processes and output processes can be set. A determining process setting tab 1301 is a tab to set various determining processes. When the user presses this tab, a determining process setting screen shown in FIG. 14 appears. An output process setting tab 1302 is a tab to set output processes. When the user presses this tab, an output process setting screen shown in FIG. 15 appears. An OK tab 1303 is a tab to confirm the settings. When the user presses this tab, the initial screen shown in FIG. 6 appears.

Figure 14:
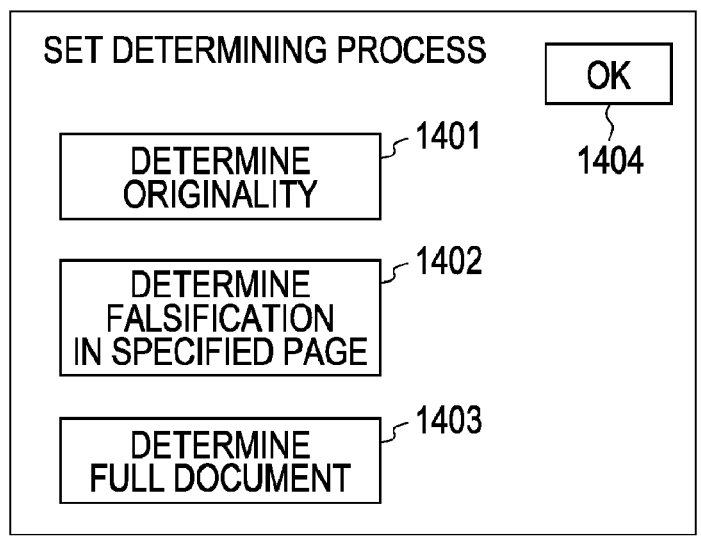
FIG. 14 shows example 3 of the operation screen.

In the determining process setting screen shown in FIG. 14, the originality determining process, the falsification-in-specified-page determining process, or the full document determining process can be set. An originality determining process tab 1401 is a tab to set the originality determining process to determine whether a read document is the original. In the originality determining process, the document is determined to be the original if all pages of the document are not falsified and if any page is not picked. A falsification-in-specified-page determining process tab 1402 is a tab to set the falsification-in-specified-page determining process to determine whether a page specified by the user is falsified. When the user presses this tab, a page specifying screen (not shown) appears. In this page specifying screen, the user can specify a page where falsification is to be determined by the apparatus 10. A full document determining process tab 1403 is a tab to set the full document determining process to determine whether a read document includes all pages. An OK tab 1404 is a tab to confirm the setting. When the user presses this tab, the screen shown in FIG. 13 appears.

Figure 15:
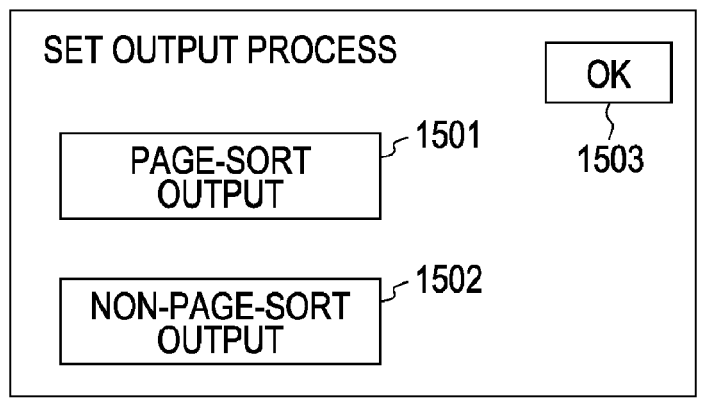
FIG. 15 shows example 4 of the operation screen.

In the output process setting screen shown in FIG. 15, a page-sort output process or a non-page-sort output process can be set. A page-sort output setting tab 1501 is a tab to set page-sort output of printing out a read document after putting the pages in correct order. A non-page-sort output setting tab 1502 is a tab to set normal output. An OK tab 1503 is a tab to confirm the setting. When the user presses this tab, the screen shown in FIG. 13 appears.

The user performs settings on the above-described operation screens, sets a document on the document table, and presses a start key. Accordingly, the detecting apparatus starts a process.

<Details of Process Performed by the Detecting Apparatus>

Figure 16:
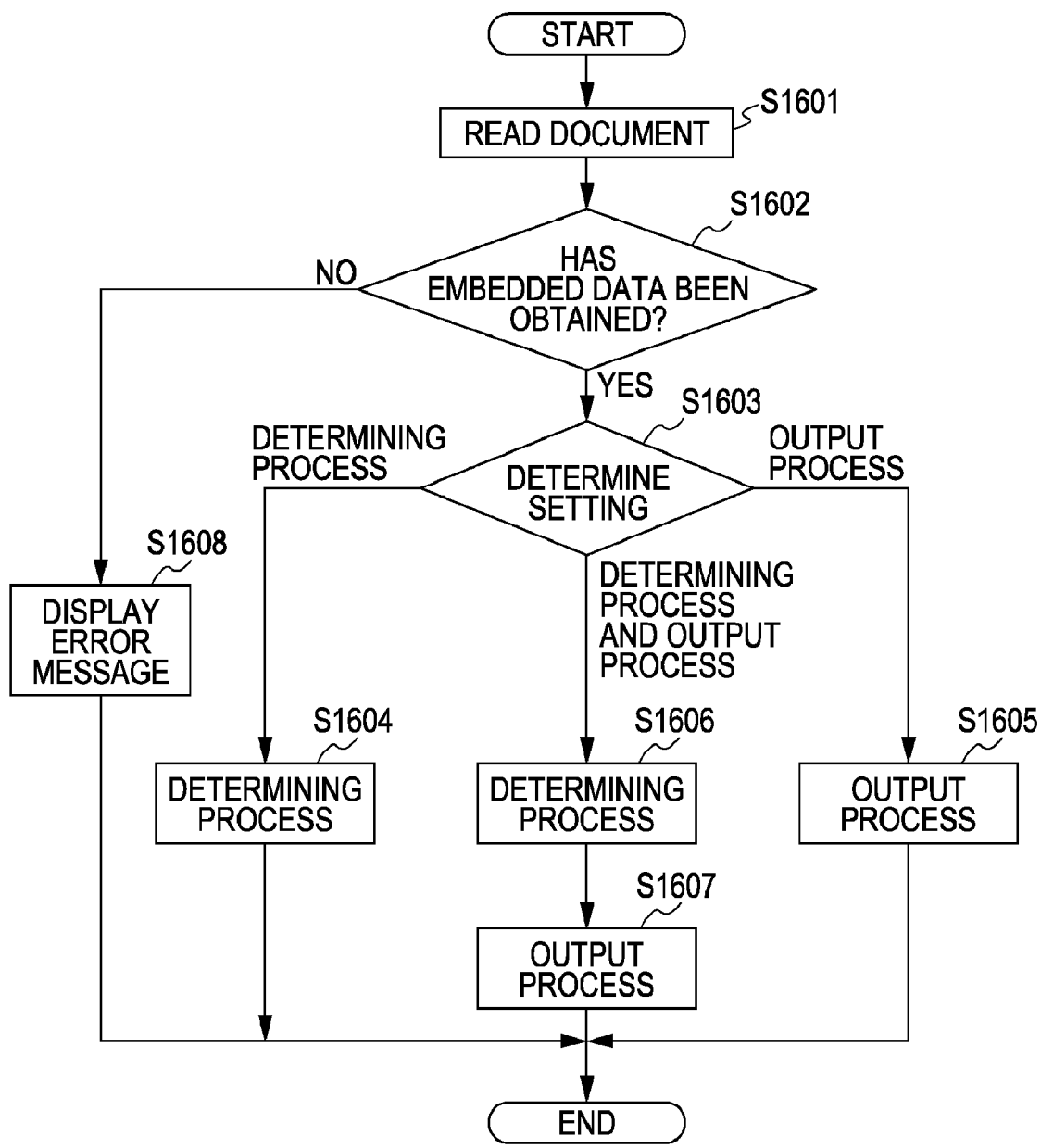
FIG. 16 shows example 2 of the process performed by the detecting apparatus.

The flowchart shown in FIG. 16 shows a process performed by the detecting apparatus according to this embodiment of the present invention. The flowchart shown in FIG. 16 is based on the assumption that any of the various determining processes and the page-sort output process has been set. If no setting has been done, the above-described copying process is performed.

Reading of a document in step S1601 is the same as that in step S1101 shown in FIG. 11, so that the description thereof is not repeated.

In step S1602, it is determined whether an embedded image exists in each page of the document image data. If an embedded image exists, it is determined whether embedded data can be obtained from the embedded image. If an embedded image exists and if embedded data can be obtained from the embedded image, the embedded data is obtained and the obtained data is stored in the RAM 302. Then, the process proceeds to step S1603. On the other hand, if no embedded image exists or if embedded data cannot be obtained from an embedded image, the process proceeds to step S1608. If embedded data in an embedded image is encrypted, the data needs to be decrypted in step S1602. If the data cannot be decrypted, the process proceeds to step S1608.

In step S1608, an error message saying that embedded data (feature value) cannot be obtained from the read document is displayed on the screen.

In step S1603, the setting performed via the operation unit 12 is determined. If it is determined in step S1603 that only a determining process has been set, the process proceeds to step S1604. If it is determined that only an output process has been set, the process proceeds to step S1605. If it is determined that both a determining process and an output process have been set, the process proceeds to step S1606. Hereinafter, a determining process performed in step S1604 or S1606 is described with reference to FIG. 17. Also, an output process performed in step S1605 or S1607 is described with reference to FIG. 18.

<Determining Process>

Figure 17:
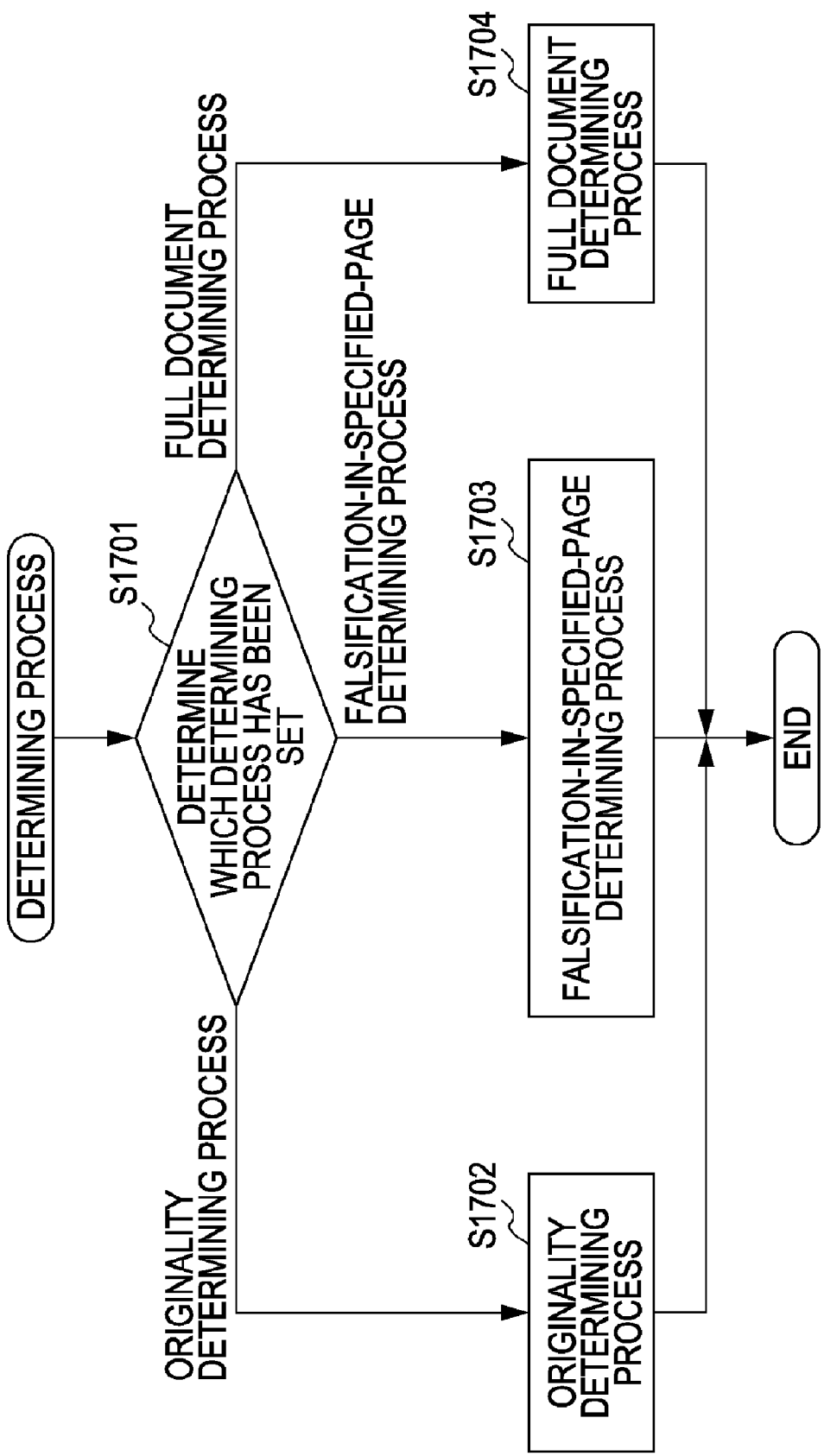
FIG. 17 shows details of various determining processes.

The flowchart shown in FIG. 17 shows a determining process according to this embodiment of the present invention.

In step S1701, the setting made via the operation unit 12 is determined. If it is determined in step S1701 that the originality determining process has been set, the process proceeds to step S1702. If it is determined that the falsification-in-specified-page determining process has been set, the process proceeds to step S1703. If it is determined that the full document determining process has been set, the process proceeds to step S1704. After the process in each step ends, the determining process ends. Hereinafter, details of steps S1702 to S1704 are described.

<Details of Falsification-in-Specified-Page Determining Process>

Figure 19:
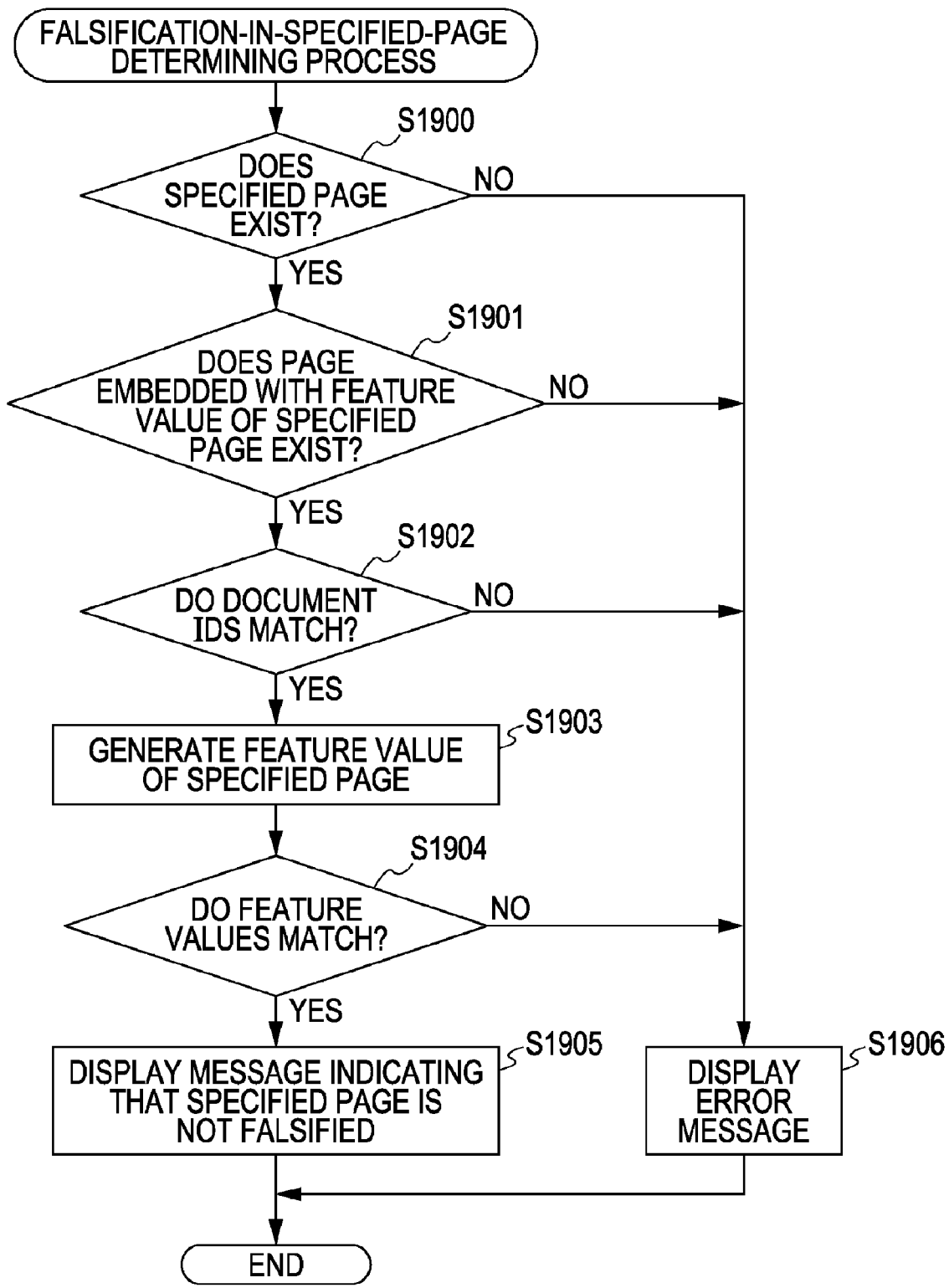
FIG. 19 shows details of a falsification-in-specified-page determining process.

In step S1703, the falsification-in-specified-page determining process is performed. The flowchart shown in FIG. 19 shows the falsification-in-specified-page determining process according to this embodiment of the present invention. In step S1703, the following process is performed by referring to the embedded data (page number, total number of pages, and document ID) obtained in step S1602 shown in FIG. 16.

In step S1900, a page specified via the operation unit 12 is obtained and it is determined whether the specified page exists in the document image data. If the specified page exists, the process proceeds to step S1901. If the specified page does not exist, the process proceeds to step S1906. For example, if the page number of the obtained specified page is 5 and if the document image data is constituted by four pages, the specified page does not exist in the document image data, so that the process proceeds to step S1906.

The embedded data in this specified page includes the page number of a page embedded with the feature value of this specified page, and the page number is obtained in step S1602 shown in FIG. 16. Hereinafter, the page embedded with the feature value of the specified page is called a "page embedded with the feature value of the specified page".

In step S1901, it is determined whether the "page embedded with the feature value of the specified page" exists in the document image data. If the page exists, the process proceeds to step S1902. If the page does not exist, the process proceeds to step S1906.

In step S1902, it is determined whether the document ID obtained from the embedded data in the "page embedded with the feature value of the specified page" matches with the document ID obtained from the embedded data in the specified page. If the document IDs match with each other, the process proceeds to step S1903. Otherwise, the process proceeds to step S1906.

In step S1903, a feature value of the specified page is generated in the same method as that performed by the feature value generating unit 801, and the generated feature value is stored in the RAM 302.

In step S1904, it is determined whether the feature value generated in step S1903 matches with the feature value obtained from the "page embedded with the feature value of the specified page". If the feature values match with each other, the process proceeds to step S1905. Otherwise, the process proceeds to step S1906.

In step S1905, existence of a page to guarantee that the specified page is not falsified is displayed.

In step S1906, an error message is displayed. The error message is for notifying the user that a page to guarantee that the specified page is not falsified does not exist.

According to the above-described configuration, even if not all pages of the original document exist, whether a specified page is falsified can be easily determined if an embedding target page exists.

<Details of Full Document Determining Process>

Figure 20:
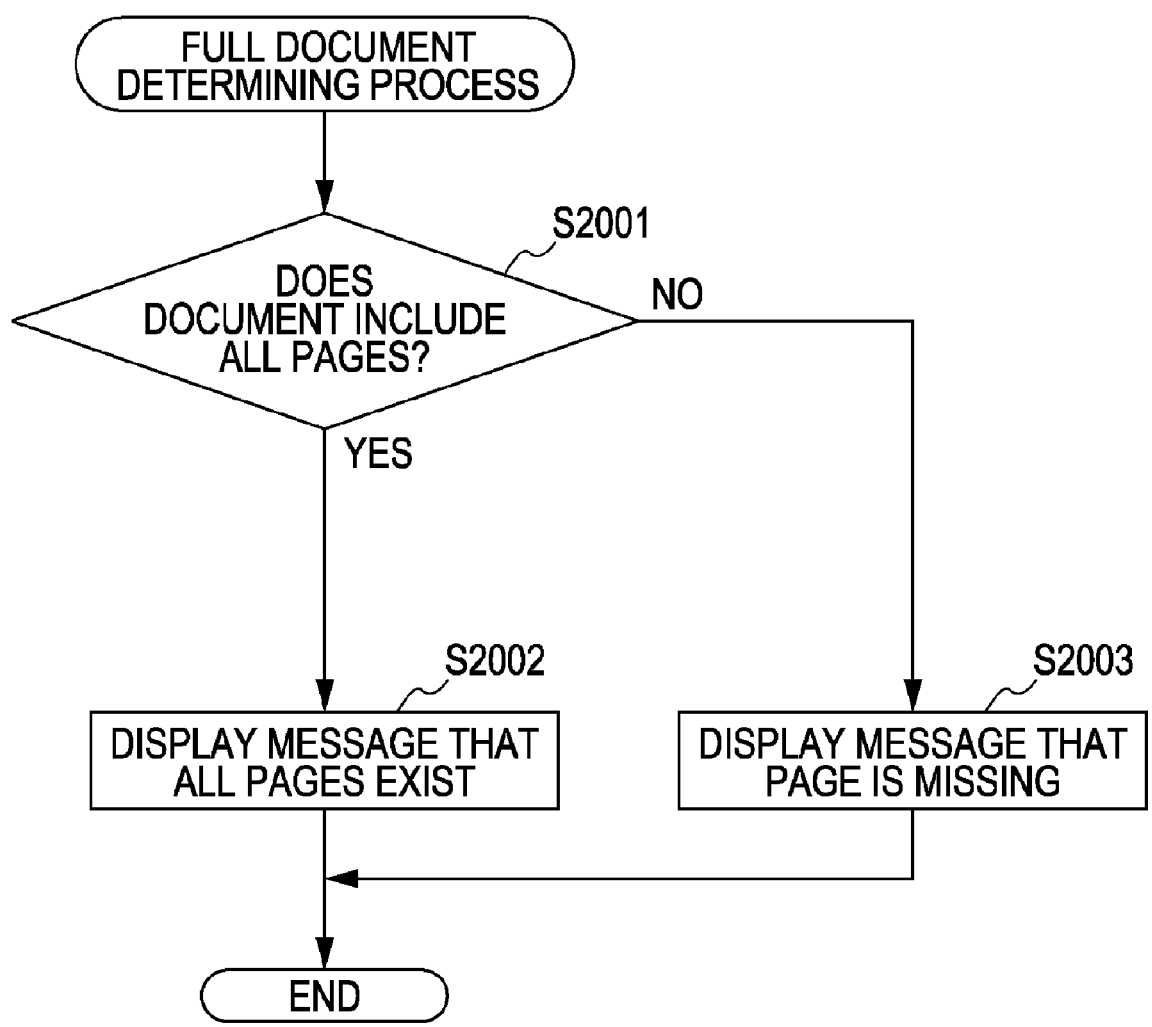
FIG. 20 shows details of a full document determining process.

In step S1704 shown in FIG. 17, the full document determining process is performed. The flowchart shown in FIG. 20 shows the full document determining process according to this embodiment of the present invention. In step S1704, the following process is performed by referring to the embedded data (page number, total number of pages, and document ID) obtained in step S1602 shown in FIG. 16.

First, in step S2001, it is determined whether a document ID has been obtained or a plurality of document IDs have been obtained. If only one document ID has been obtained, it is determined whether the document includes all pages on the basis of the number of pages of the read document image and the total number of pages and page numbers obtained in step S1602 shown in FIG. 16. If a plurality of document IDs have been obtained, this process is performed for each document.

If it is determined in step S2001 that the document image data includes all pages, the process proceeds to step S2002. Otherwise, the process proceeds to step S2003.

In step S2002, a message saying that the document includes all pages is displayed on the operation screen of the operation unit 12. At the same time, the number of documents can also be displayed.

In step S2003, a message saying that the document includes a missing page is displayed. At the same time, the number of documents can also be displayed.

<Details of Originality Determining Process>

Figure 21:
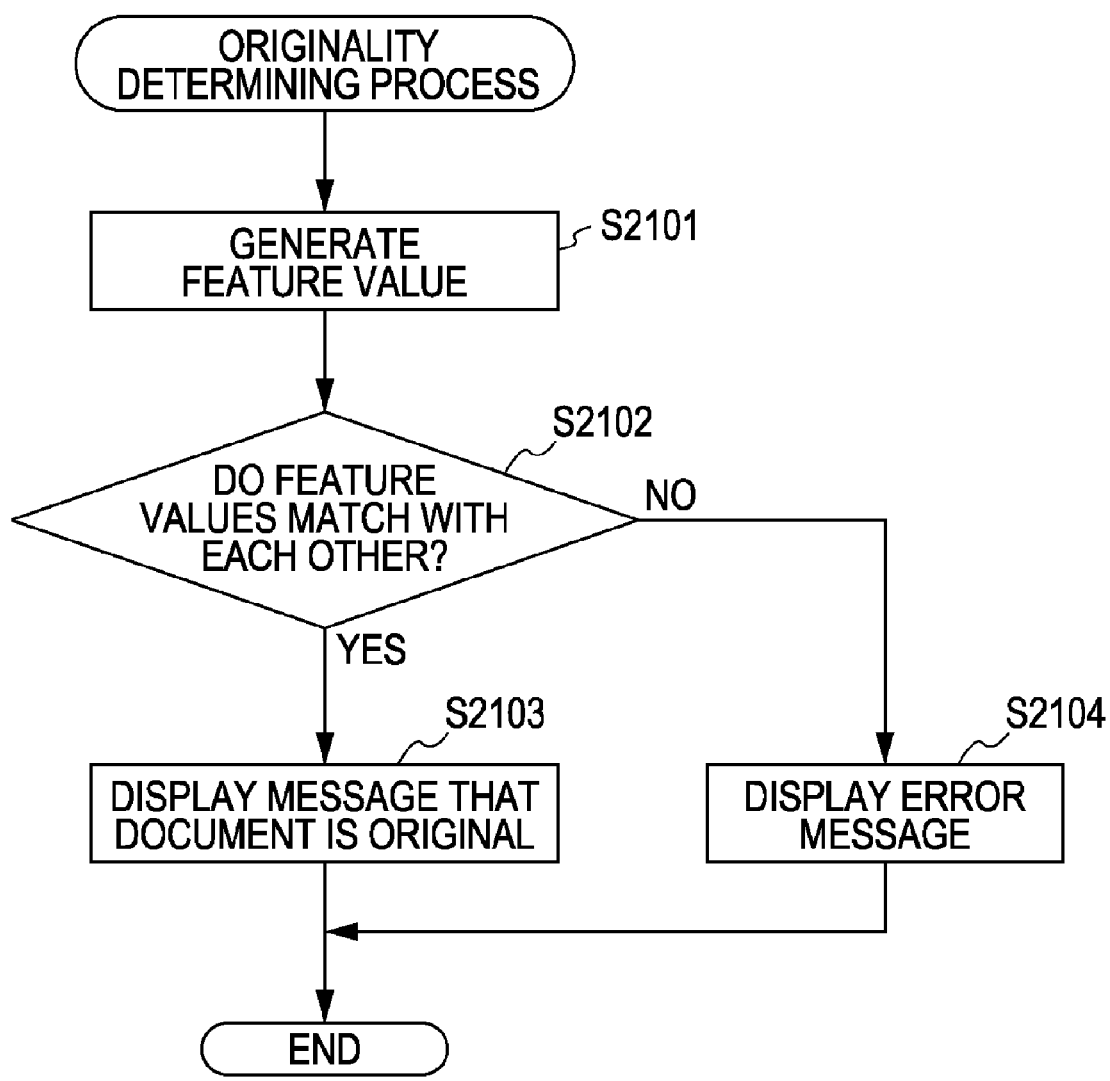
FIG. 21 shows details of an originality determining process.

In step S1702 shown in FIG. 17, the originality determining process is performed. The flowchart shown in FIG. 21 shows the originality determining process according to this embodiment of the present invention.

First, in step S2101, a feature value of each page of the document image data is generated by the same method as that performed by the feature value generating unit 1001, and the generated feature value is stored in the RAM 302.

In step S2102, the feature value in the embedded data obtained in step S1602 is compared with the feature value generated in step S2101 and it is determined whether the both feature values match with each other. If the feature values match with each other in all pages, the process proceeds to step S2103. If a page in which the feature values do not match with each other exists, the process proceeds to step S2104.

Then, in step S2103, a message saying that the read document is the original is displayed on the operation screen of the operation unit 12.

In step S2104, an error message saying that the read document is not the original is displayed on the operation screen of the operation unit 12. For example, a message "There is a possibility that the document has been falsified." is displayed.

<Output Process>

Figure 18:
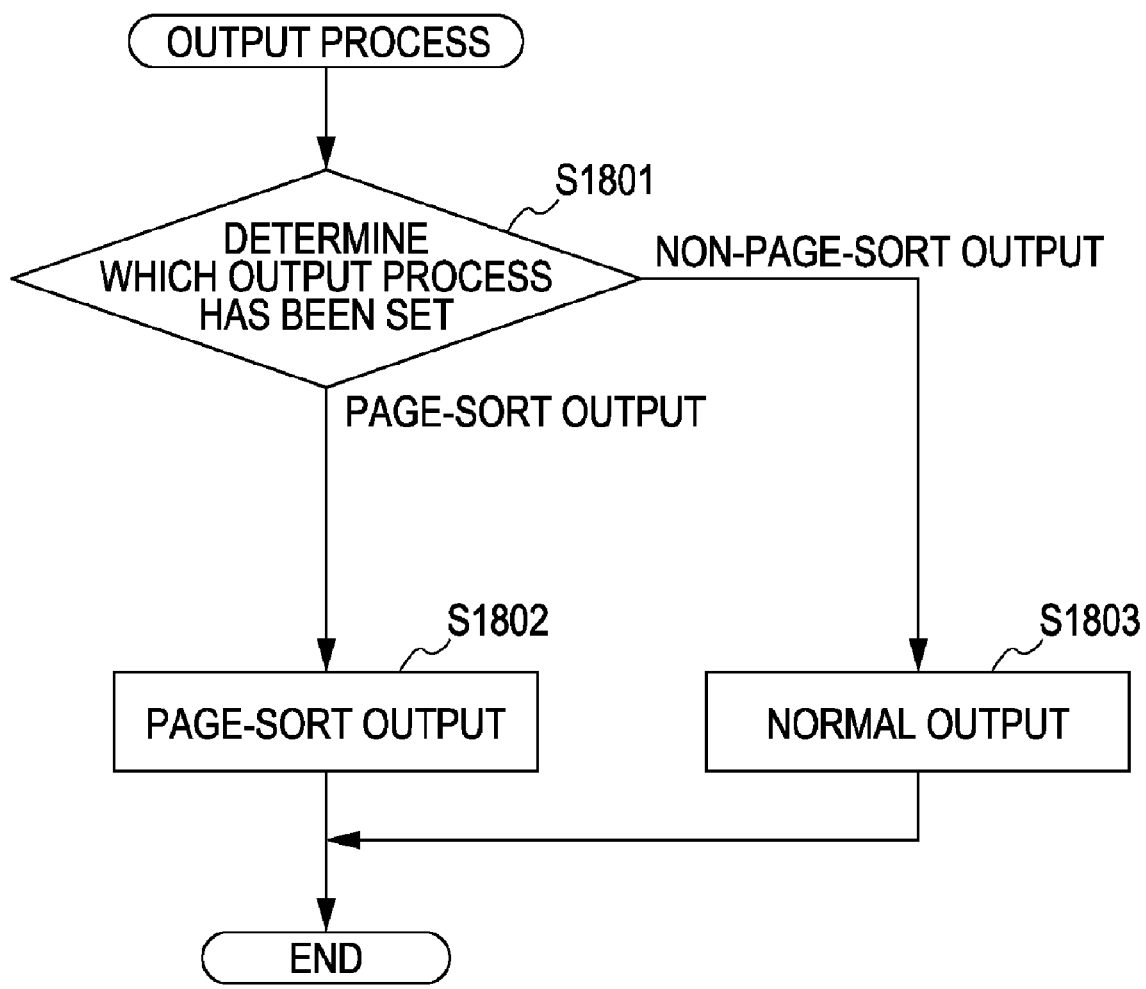
FIG. 18 shows details of an output process.

The flowchart shown in FIG. 18 shows the output process according to this embodiment of the present invention. In this flowchart, the following process is performed by referring to the embedded data (page number, total number of pages, and document ID) obtained in step S1602 shown in FIG. 16.

In step S1801, a process according to the setting made via the operation unit 12 is determined. That is, if the non-page-sort output process is set, the process proceeds to step S1803. In step S1803, normal printout is performed. The details of the normal printout have been described above in <description about copying operation>, and thus the description there of is not repeated. On the other hand, if the page-sort output process is set, the process proceeds to step S1802. In step S1802, the page-sort output process is performed. This process is described in detail below.

In step S1802, the page numbers and document ID(s) are obtained from the embedded data obtained in step S1602. Then, it is determined whether only one document ID has been obtained or a plurality of document IDs have been obtained. If only one document ID has been obtained, the pages of the document are sorted. For example, if the read document includes page k, page k+2, and page k+1 put in this order, the pages are sorted in the order of page k, page k+1, and page k+2. If a plurality of document IDs have been obtained, page sort is performed on each document. Additionally, if a document includes sets, a partition can be provided between the sets.

In the above-described configuration, a determining process is performed only after instructions to perform a determining process have been received from the user. However, the present invention is not limited to this configuration. For example, a determining process that is automatically performed in response to instructions to copy a document provided to an image forming apparatus, such as a copying machine, may be set as a default. For example, if the originality determining process is set as a default, the originality determining process is automatically performed regardless of user's intent. Such a configuration of setting a determining process as a default is the same for the other embodiments.

In the above-described configuration, a determining process is performed in response to instructions from the user and a determination result is displayed. However, the following control may be performed to an output operation in addition to display of the result. For example, if a document is determined not to be the original (or if a specified page is falsified or if a page is missing), the document may not be output even if instructions to output the document (page-sort output or normal output) have been provided from the user. In the detecting apparatus having such a configuration, only a document free from defect is copied. Accordingly, circulation of copies of a falsified document can be prevented.

According to the above-described second embodiment, the following advantages can be obtained in addition to the advantages of the first embodiment. That is, the user can specify a page that is to be determined whether it is falsified.

In the determination of falsification in a specified page, a determination result can be obtained more quickly than in determination of falsification in all pages.

Furthermore, if the user wants to determine whether the document includes all pages, the user can provide the instructions. Of course, the speed of the full document determining process is higher than that of the originality determining process, in which a feature value of each page is generated. Thus, the user can determine whether the document includes all pages in a short time.

Also, a document can be copied and output by sorting the pages.

Third Embodiment

<The Case where Feature Value and so on is Embedded in Own Page, not in Another Page>

In the above-described first and second embodiments, a feature value of a selected page is embedded in another page so as to generate an originality-guaranteed output.

However, the present invention is not limited to this method. For example, a feature value of a selected page may be embedded in the selected page (same page) so as to generate an originality-guaranteed output. However, when an originality-guaranteed output is to be generated by embedding the feature value in the same page, a document ID and a total number of pages need to be embedded in the selected page, in addition to the feature value of the selected page. Hereinafter, reasons for embedding those pieces of information in the selected page are described.

For example, assume a case where someone picks a page out of a document including a plurality of pages in which a total number of pages is not embedded. If a person receives the document after the page has been picked, he/she cannot know the total number of pages of the original document. As a result, this picking action is overlooked. However, if the total number of pages is embedded in the document, the fact that a page is missing can be determined.

Also, assume a case where someone adds some information to a page in a document including a plurality of pages in which a feature value is not embedded. If a person receives the document after the information has been added, he/she cannot know the original content of the document. As a result, this adding action is overlooked. However, if the feature value is embedded in the document, the fact that some information has been added can be determined (because the feature value changes).

Also, assume a case where someone picks a page out of a document including a plurality of pages in which a document ID is not embedded and adds a new page to the document. If a person receives the document after the page has been replaced, he/she cannot know that the document includes a false page (the fact the page has been replaced). As a result, the replacement is overlooked. However, if a document ID is embedded in the document, the fact that the page has been replaced by another page can be determined (because the document ID is different in the false page).

For the reasons described above, a feature value of a page, a total number of pages, and a document ID are embedded in each page, so as to generate an originality-guaranteed output in this embodiment.

On the other hand, the detecting apparatus reads the document and obtains a document ID, a feature value, and a total number of pages embedded in the read document. Then, the detecting apparatus generates a feature value from each page of the document image, counts the total number of pages of the document image, and compares the counted number with the obtained number of pages. Then, the detecting apparatus determines whether the document ID obtained from the document image is the same in all pages. Also, the detecting apparatus compares the embedded feature value with the generated feature value.

After the comparison, the detecting apparatus determines whether three conditions are satisfied: whether the total numbers of pages match, whether the feature values match in each page, and whether the document ID is the same in all pages. If determining that the three conditions are satisfied, the detecting apparatus determines that the document image is an originality-guaranteed output. If at least one of the three conditions is not satisfied, the detecting apparatus determines that the document image is not an originality-guaranteed output (there is a possibility that the document is falsified).

In the above-described embodiment, a feature value of a selected page is embedded in the selected page, and a total number of pages and a document ID are also embedded in each page. However, in this embodiment, information other than those three pieces of information may also be embedded. For example, the page number of each page may be embedded. If the page number of each page is embedded, pages can be output after being sorted.

As described above, in the third embodiment, information of a page need not be embedded in another page, and information embedded in another page need not be obtained, so that a process can be performed within each page, unlike in the first and second embodiments. Accordingly, throughput can be enhanced and storage capacity can be reduced during generation of an originality-guaranteed output.

However, the possibility that the originality-guaranteed output is falsified by someone increases disadvantageously. For example, assume a case where embedded information (document ID, a total number of pages, and a page number of each page) of an originality-guaranteed output including a plurality of pages is obtained and a page embedded with the obtained information is newly generated. Also, assume that one of the pages in the originality-guaranteed output is replaced by the new page. If such replacement is performed, the originality-guaranteed output is falsified. On the other hand, in the first and second embodiments, a feature value of a page is embedded in another page. Therefore, if someone wants to falsify a page, he/she needs to falsify another page, too. This requires a lot of time and falsification is more difficult to perform.

Hereinafter, details of a process according to the third embodiment are described with reference to FIG. 10.

<Process of Generating Originality-Guaranteed Output>

The flowchart shown in FIG. 7 shows a process of generating an originality-guaranteed output according to this embodiment. The flowchart shown in FIG. 7 has been described above, and thus the description thereof is not repeated. However, step S708 in the third embodiment is different from that in the first embodiment, so that step S708 is described in detail below.

<Details of Step S708>

The block diagram shown in FIG. 10 shows step S708 according to this embodiment.

The feature value generating unit 1001 selects each page of document image data stored in the RAM 302. The page selected is called a selected page. Image data of a page is called page image data.

Also, the feature value generating unit 1001 obtains information indicating an area of the selected page from which a feature value should be generated. This area is called a feature value generation area. The feature value generation area is desirably fixed in any document image data or in any image forming apparatus. Accordingly, the detecting apparatus can easily generate a feature value from a feature value generation area of each page. If the feature value generation area is the same in any document and in any apparatus, the detecting apparatus does not need to search for the feature value generation area in each page.

Also, the feature value generating unit 1001 generates a feature value on the basis of image data in a feature value generation area of a selected page. After generating the feature value of the selected page, the feature value generating unit 1001 transmits the feature value to the feature value storing unit 1002. Then, the feature value generating unit 1001 selects a next page and generates a feature value of the newly selected page. The feature value generating unit 1001 repeats this process until completing generation of a feature value of the last page. The method for generating a feature value is the same as that of the first embodiment, and thus the corresponding description is not repeated.

Then, the feature value storing unit 1002 stores the feature value generated by the feature value generating unit 1001 in the RAM 302.

The embedded data generating unit 1003 generates a document ID. The document ID is a unique ID and is generated for each document including a plurality of pages. When a plurality of copies of the document are to be output, a unique ID is generated for each copy. An example of the document ID is a character string generated on the basis of a serial number of the image forming apparatus 10 and date/time of output. The serial number of the image forming apparatus 10 is stored in the ROM 303. Therefore, the serial number needs to be read from the ROM 303.

Also, the embedded data generating unit 1003 obtains a total number of pages from the document image data.

Also, the embedded data generating unit 1003 generates embedded data including the total number of pages, the document ID, and the feature value stored in the RAM 302.

Then, the embedded image data generating unit 1004 receives the embedded data and generates embedded image data including the embedded data. As in the first embodiment, the embedded image data is generated in a form of a visible pattern or a watermark. Note that, data of a page number and a total number of pages may be generated in a form of a character string image that is visible by human eyes, not in a form of a pattern or a watermark. However, the embedded image data generating unit 1004 generates embedded image data so that the detecting apparatus can obtain the embedded data from the embedded image existing in the originality-guaranteed output.

Then, the embedded image data storing unit 1005 stores the embedded image data generated by the embedded image data generating unit 1004 in the RAM 302.

The combining unit 1006 reads the document image data stored in the RAM 302 and the embedded image data stored in the RAM 302. Then, the combining unit 1006 combines the embedded image data into a predetermined area of image data of an embedding target page so as to generate composite image data, and stores the composite image data in the RAM 302. The predetermined area is called an embedding target area. The embedding target area is different from the above-described feature value generation area so that the detecting apparatus does not perform wrong determination.

As described above, in the third embodiment, the generated embedded image data includes a total number of pages and a document ID in addition to a feature value, unlike in the first embodiment. Of course, a page number may be embedded in each page as necessary.

Then, as in the first embodiment, the generated embedded image data is combined into the document image data, so that an originality-guaranteed output is generated.

The description about the method for generating an originality-guaranteed output ends now.

<Process Performed by the Detecting Apparatus>

Hereinafter, details of a process performed by the detecting apparatus are described. The following description is based on the assumption that a total number of pages, a document ID, and page numbers are embedded in an originality-guaranteed output, as well as a feature value.

The detecting apparatus is capable of performing a falsification-in-specified-page determining process, a full document determining process, and a page-sort output process, in addition to the originality determining process described in the first embodiment.

Herein, the falsification-in-specified-page determining process is a process of determining whether a page specified by a user in a read document is falsified. The full document determining process is a process of determining whether a read document includes all pages. The page-sort output process is a process of putting out-of-order pages of a read document in correct order and outputting the document. In the page-sort output process, if a plurality of documents exist, the respective documents can be individually sorted and output.

The following description is made on the assumption that the detecting apparatus is the image forming apparatus 10, but the present invention is not limited to this. For example, the image forming apparatus 20 having the same configuration as that of the image forming apparatus 10, the image forming apparatus 30 that does not have a reading unit, or the host computer 40 can perform various detecting processes. Note that, if the image forming apparatus 30 that does not have a reading unit or the host computer 40 performs the following processes, the apparatus needs to receive document image data generated on the basis of a document read by a reading unit.

<Screen for Setting Process Performed by the Detecting Apparatus>

Before describing a specific process performed by the detecting apparatus, an operation screen is described.

FIG. 13 shows an operation screen used by a user to perform settings. On this operation screen, various determining processes and output processes can be set. A determining process setting tab 1301 is a tab to set various determining processes. When the user presses this tab, a determining process setting screen shown in FIG. 14 appears. An output process setting tab 1302 is a tab to set output processes. When the user presses this tab, an output process setting screen shown in FIG. 15 appears. An OK tab 1303 is a tab to confirm the settings. When the user presses this tab, the initial screen shown in FIG. 6 appears.

In the determining process setting screen shown in FIG. 14, the originality determining process, the falsification-in-specified-page determining process, or the full document determining process can be set. An originality determining process tab 1401 is a tab to set the originality determining process to determine whether a read document is the original. In the originality determining process, the document is determined to be the original if all pages of the document are not falsified. A falsification-in-specified-page determining process tab 1402 is a tab to set the falsification-in-specified-page determining process to determine whether a page specified by the user in the read document is falsified. When the user presses this tab, a page specifying screen (not shown) appears. In this page specifying screen, the user can specify a page where it should be determined by the apparatus 10 whether falsification has been done. Herein, if the user specifies page 3, falsification determination is performed on the page that is thirdly read in the document. A full document determining process tab 1403 is a tab to set the full document determining process to determine whether a read document includes all pages. An OK tab 1404 is a tab to confirm the settings. When the user presses this tab, the screen shown in FIG. 13 appears.

In the output process setting screen shown in FIG. 15, a page-sort output process or a non-page-sort output process can be set. A page-sort output setting tab 1501 is a tab to set page-sort output of outputting a read document after putting the pages in correct order. A non-page-sort output setting tab 1502 is a tab to set normal output. An OK tab 1404 is a tab to confirm the settings. When the user presses this tab, the screen shown in FIG. 13 appears.

The user performs settings on the above-described operation screens, puts a document on the document table, and provides instructions to copy the document.

<Details of Process Performed by the Detecting Apparatus>

The flowchart shown in FIG. 16 shows a process performed by the detecting apparatus according to this embodiment of the present invention. The flowchart shown in FIG. 16 is based on the assumption that any of the various determining processes and the page-sort output process has been set. If no setting has been done, the above-described copying process is performed.

Reading of a document in step S1601 is the same as that in step S1101, so that the description thereof is not repeated.

In step S1602, embedded data is obtained from images embedded in respective pages of the document image data. If a page that is not provided with an embedded image exists or if a page from which embedded data cannot be obtained because it cannot be decrypted exists, the process proceeds to step S1608.

In step S1603, a process according to the setting made via the operation unit 12 is determined. That is, if it is determined that only a determining process has been set, the process proceeds to step S1604. If it is determined that only an output process has been set, the process proceeds to step S1605. If it is determined that both a determining process and an output process have been set, the process proceeds to step S1606. Hereinafter, a determining process performed in step S1604 or S1606 is described with reference to FIG. 17. Also, an output process performed in step S1605 or S1607 is described with reference to FIG. 18.

<Determining Process>

The flowchart shown in FIG. 17 shows a determining process according to this embodiment of the present invention.

In step S1701, the setting made via the operation unit 12 is determined. If it is determined in step S1701 that the originality determining process has been set, the process proceeds to step S1702. If it is determined that the falsification-in-specified-page determining process has been set, the process proceeds to step S1703. If it is determined that the full document determining process has been set, the process proceeds to step S1704. After the process in each step ends, the determining process ends. Hereinafter, details of steps S1702 to S1704 are described.

<Details of Falsification-in-Specified-Page Determining Process>

In step S1703, the falsification-in-specified-page determining process is performed. The flowchart shown in FIG. 19 shows the falsification-in-specified-page determining process according to this embodiment of the present invention.

In step S1901, it is determined whether the page specified via the operation unit 12 exists. If the specified page exists, the process proceeds to step S1902. If the specified page does not exist, the process proceeds to step S1906.

In step S1902, it is determined whether a document ID exists in embedded data of the specified page. If the document ID exists, the process proceeds to step S1903. If the document ID does not exist, the process proceeds to step S1906. Note that, although S1902 shown in FIG. 19 describes that "Do document IDs match?", whether the document ID exists is determined in step S1902 in this embodiment.

In step S1903, a feature value of the specified page is generated in the same method as that performed by the feature value generating unit 801, and the generated feature value is stored in the RAM 302.

In step S1904, it is determined whether the generated feature value matches with the obtained feature value. If the feature values match with each other, the process proceeds to step S1905. Otherwise, the process proceeds to step S1906.

In step S1905, a message saying that the possibility that the specified page is not falsified is high is displayed.

In step S1906, an error message is displayed. The error message is for notifying the user that the specified page is falsified or that the specified page does not exist.

According to the above-described configuration, even if not all pages of the original document exist, whether a specified page is falsified can be easily determined.

<Details of Full Document Determining Process>

In step S1704 shown in FIG. 17, the full document determining process is performed. The flowchart shown in FIG. 20 shows the full document determining process according to this embodiment of the present invention.

In step S2001, it is determined whether embedded data includes one document ID or a plurality of document IDs. If the embedded data includes one document ID, it is determined whether all pages corresponding to the document ID exist. The determination is made on the basis of a total number of pages and page numbers. If the embedded data includes a plurality of document IDs, it is determined whether all pages corresponding to each document ID exist. If all pages exist, the process proceeds to step S2002. Otherwise, the process proceeds to step S2003.

In step S2002, a message saying that the document includes all pages is displayed on the operation screen of the operation unit 12. At the same time, the number of documents can also be displayed.

In step S2003, a message saying that the document includes a missing page is displayed on the operation screen of the operation unit 12. At the same time, the page number of the missing page can also be displayed.

<Details of Originality Determining Process>

Figure 29:
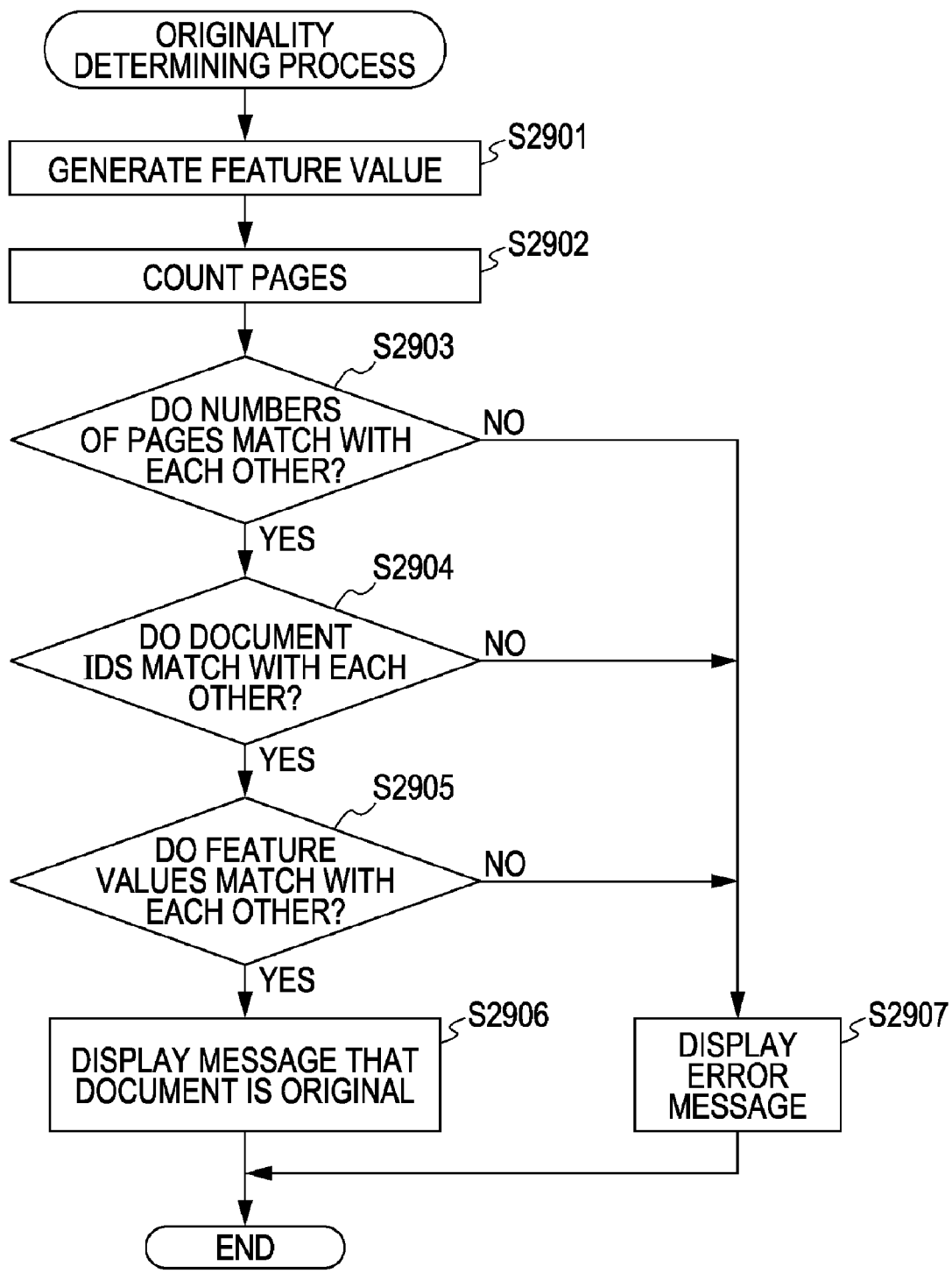
FIG. 29 shows details of an originality determining process.

In step S1702 shown in FIG. 17, the originality determining process is performed. The flowchart shown in FIG. 29 shows the originality determining process according to this embodiment of the present invention.

First, in step S2901, a feature value of each page of the document image data is generated in the same method as that performed by the feature value generating unit 801, and the generated feature value is stored in the RAM 302.

In step S2902, the number of pages of the document image is counted so as to calculate the total number of pages.

In step S2903, it is determined whether the counted number of pages is equal to the number of pages obtained from the embedded image data. If the both numbers are equal to each other, the process proceeds to step S2904. Otherwise, the process proceeds to step S2907.

In step S2904, it is determined whether the document ID is the same in all pages. If the document ID is the same, the process proceeds to step S2905. Otherwise, the process proceeds to step S2907.

In step S2905, it is determined whether the generated feature value matches with the obtained feature value. If the both feature values match with each other, the process proceeds to step S2906. Otherwise, the process proceeds to step S2907.

In step S2906, a message saying that the read document is the original is displayed on the operation screen of the operation unit 12.

In step S2907, an error message is displayed on the operation screen of the operation unit 12. Specifically, a message saying that the originality is not guaranteed in the read document is displayed.

<Output Process>

The flowchart shown in FIG. 18 shows the output process according to this embodiment of the present invention.

In step S1801, the process according to the setting made via the operation unit 12 is determined. That is, if the non-page-sort output process is set, the process proceeds to step S1803. In step S1803, normal printout is performed. The details of the normal printout have been described above in <description about copying operation>, and thus the description thereof is not repeated. On the other hand, if the page-sort output process is set, the process proceeds to step S1802. In step S1802, the page-sort output process is performed. This process is described in detail below.

In step S1802, the page numbers and document ID(s) are obtained from the embedded data obtained in step S1602. Then, it is determined whether only one document ID has been obtained or a plurality of document IDs have been obtained. If only one document ID has been obtained, the pages of the document are sorted. For example, if the document includes page k, page k+2, and page k+1 put in this order, the pages are sorted in the order of page k, page k+1, and page k+2. If a plurality of document IDs have been obtained, page sort is performed on each document. Additionally, if a document includes sets, a partition can be provided between the sets.

In the above-described configuration, a determining process is performed only after instructions to perform a determining process have been received from the user. However, the present invention is not limited to this configuration. For example, every time instructions to copy a document are provided to an image forming apparatus such as a copying machine, whether an embedded image exists in the document may be determined, and if an embedded image exists, whether the document is the original may be determined. In the detecting apparatus having such a configuration, the user who has provided instructions to copy a document can be automatically notified whether the document is the original. Therefore, if a user provides instructions to copy a document without knowing that the document is not the original, the user can be notified that the document is not the original.

In the above-described configuration, various determinations are made in response to instructions from a user and a determination result is displayed. However, in addition to displaying the determination result, a document that has been determined to be the original (or determined that a specified page is not falsified or that the document includes all pages) may be copied. The detecting apparatus having such a configuration has advantages that various determinations can be made and that a document determined not to have any defect can be easily copied.

According to the above-described third embodiment, the following advantages can be obtained in addition to the advantages of the first embodiment. That is, whether a specified page in a document has been falsified can be determined. This determination can be made more quickly than a determination of whether all pages of a document have been falsified. Also, whether a document includes all pages can be determined. In that case, the process can be performed more quickly compared to a case of determining whether all pages of a document are falsified because a feature value of each page need not be generated. Also, a document can be copied and output after the pages thereof have been sorted.

Fourth Embodiment

<The Case where Feature Value Generated from a Page Embedded with Feature Value is Embedded in Another Page>

In the first and second embodiments, a feature value is generated from each page before the page is embedded with a feature value, and the generated feature value is embedded in another page. However, the present invention is not limited to this method. For example, a feature value can be generated from each page that is embedded with a feature value of another page, and the generated feature value can be embedded in another page. Hereinafter, a method for generating an originality-guaranteed output and a method for detecting the originality-guaranteed output in this case are briefly described.

The generating method and the detecting method are described by assuming the following case: a document including three pages is a target and a feature value of an image in page k is embedded in page k+1. At this time, a feature value of an image of the third page is embedded in the first page.

Figure 22:
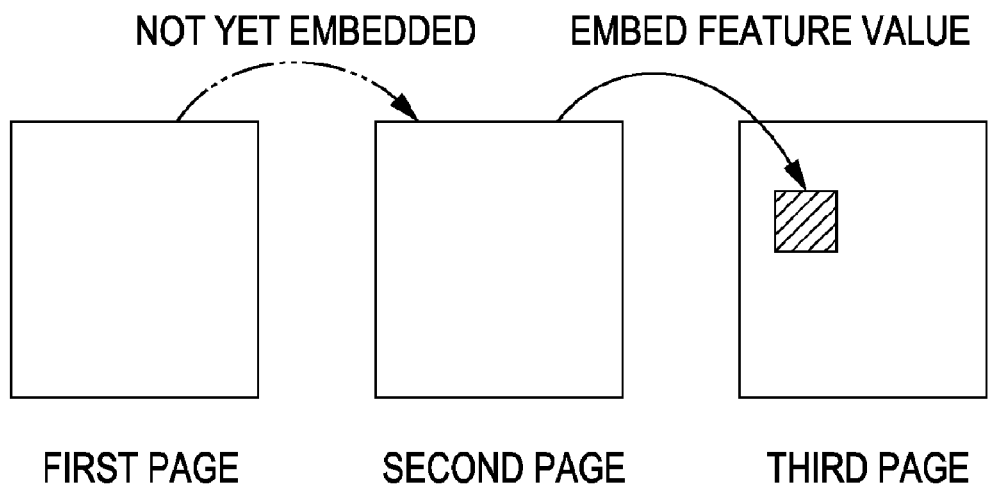
FIG. 22 is illustration 1 of a process according to a fourth embodiment.
Figure 23:
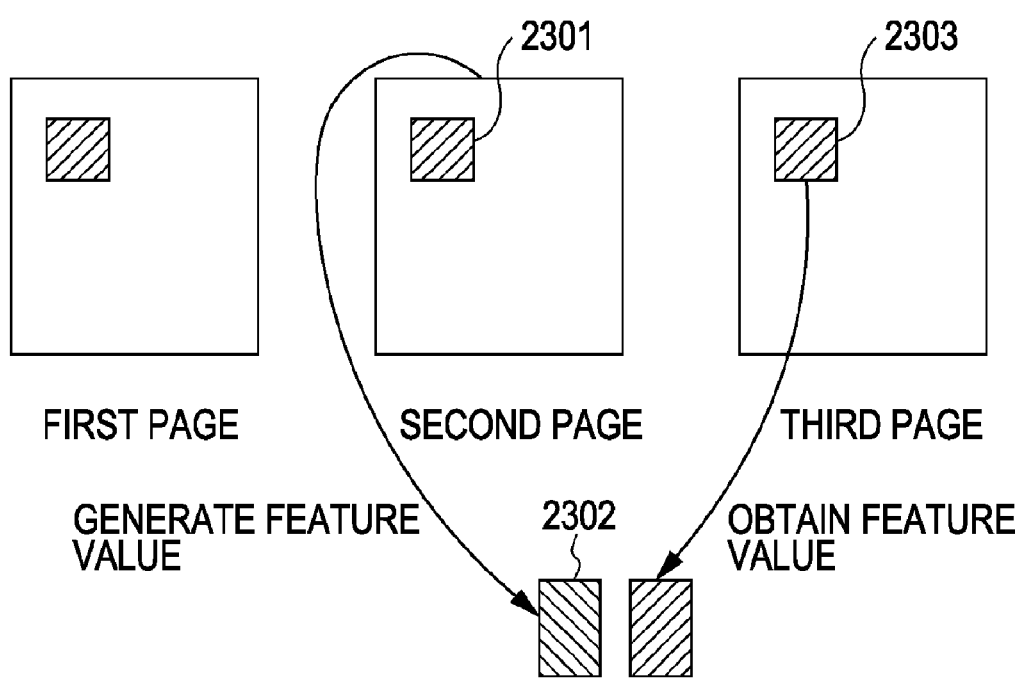
FIG. 23 is illustration 2 of a process according to the fourth embodiment.

When an originality-guaranteed output is to be generated in the first and second embodiments, a feature value is generated from a second page that is not yet embedded with the feature value of a first page, and the generated feature value is embedded in a third page (see FIG. 22). On the other hand, the detecting apparatus reads the feature value of the second page from the third page and generates a feature value from the second page in an originality-guaranteed output in which a feature value is embedded in each page (see FIG. 23). Then, the detecting apparatus determines whether the read feature value is equal to the generated feature value.

In this case, a feature value 2303 read from the third page by the detecting apparatus is normally different from a feature value 2302 generated from the second page by the detecting apparatus. This is because an effect of a feature value 2301 of the first page is exerted on only the feature value 2302 generated from the second page by the detecting apparatus. That is, a wrong determination can be made. In order to prevent a wrong determination, a feature value generation area is made different from an area embedded with a feature value, or a transparent watermark is used as embedded image data when an originality-guaranteed output is generated in the first and second embodiments.

Figure 24:
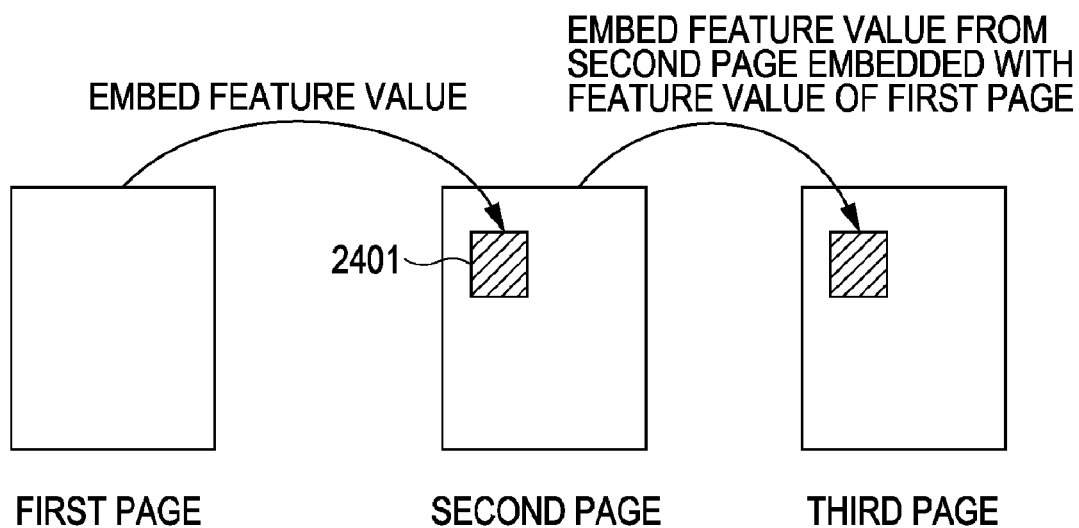
FIG. 24 is illustration 3 of a process according to the fourth embodiment.
Figure 25:
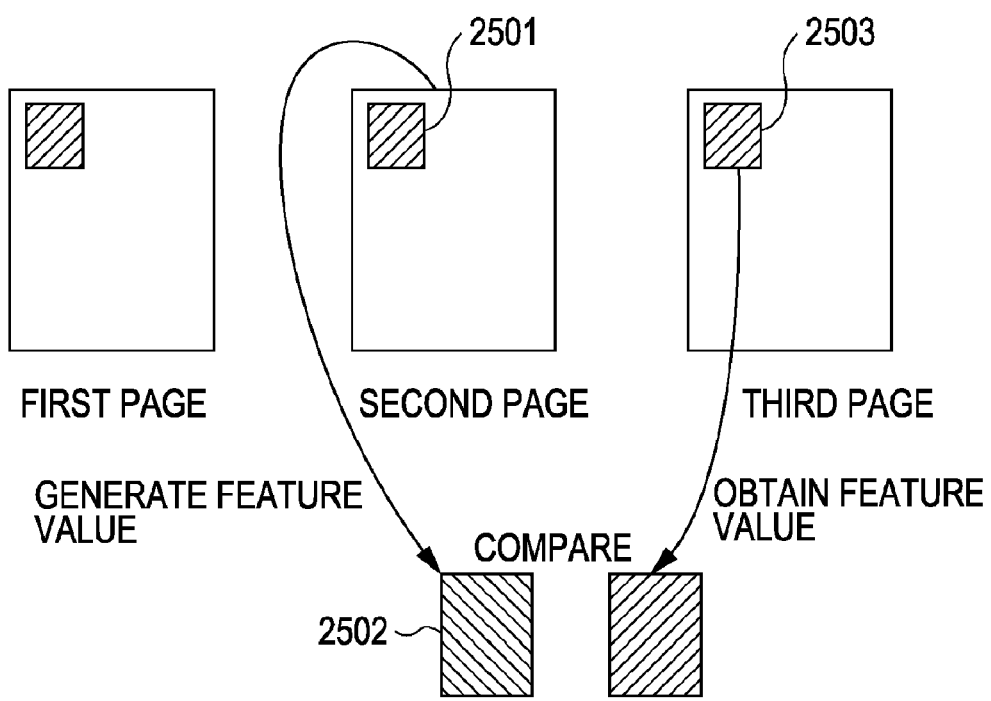
FIG. 25 is illustration 4 of a process according to the fourth embodiment.

On the other hand, in this embodiment, a feature value is generated from the second page that has been embedded with a feature value 2401 of the first page, and the generated feature value is embedded in the third page (see FIG. 24). That is, this embodiment is different from the first and second embodiments in that a feature value is generated from a page that has been embedded with a feature value. Then, the detecting apparatus reads the feature value of the second page from the third page and generates a feature value from the second page at the same time (see FIG. 25). Then, the detecting apparatus determines whether these feature values are equal to each other. As described above, in this embodiment, the image of the second page that has been embedded with a feature value 2501 of the first page is reflected on both the feature value 2502 generated from the second page and the feature value 2503 read from the third page. Therefore, a wrong determination can be prevented even if the feature value generation area is not different from the area embedded with a feature value and if a transparent watermark is not used as embedded image data when an originality-guaranteed output is generated.

Figure 26:
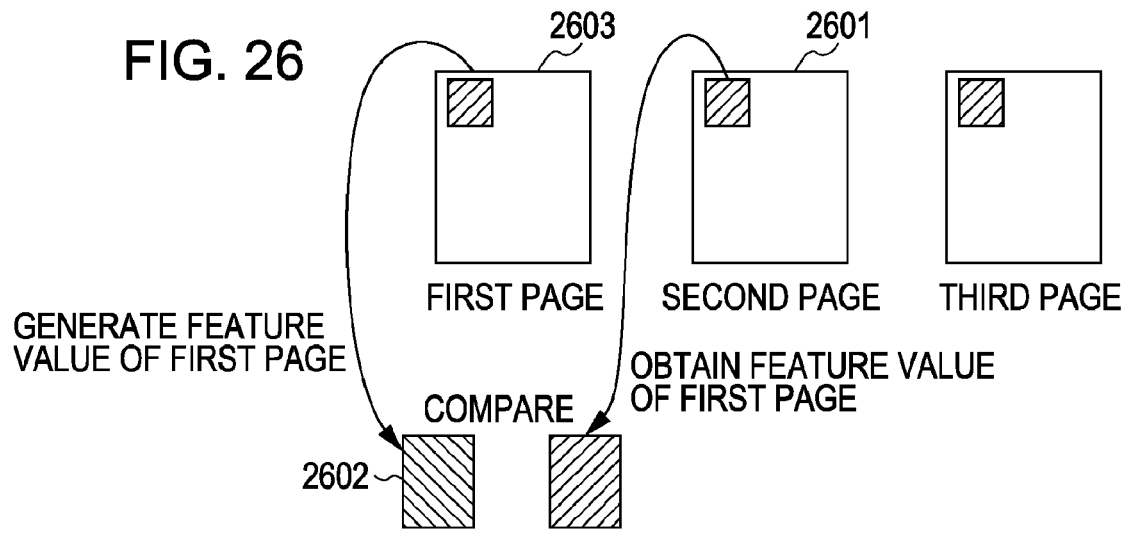
FIG. 26 is illustration 5 of a process according to the fourth embodiment.

In this case, however, a problem occurs when it is determined whether the first page is falsified. This is because a feature value 2601 of the first page embedded in the second page is generated from an image of the first page that is not yet embedded with a feature value 2603 of the third page (see FIG. 26). On the other hand, the feature value 2603 of the third page is embedded in the first page of the originality-guaranteed output, and thus an effect of the feature value 2603 of the third page is exerted on a feature value 2602 generated from the first page (see FIG. 26). Therefore, when the detecting apparatus compares the both pages, the feature values of the pages differ from each other, which causes a wrong determination (except a case where a transparent watermark is used as embedded image data).

Figure 27:
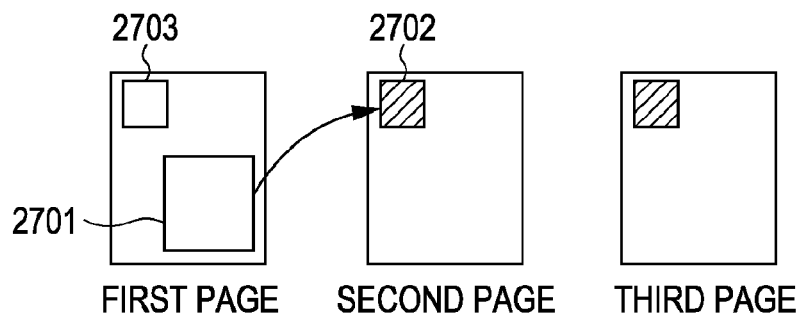
FIG. 27 is illustration 6 of a process according to the fourth embodiment.
Figure 28:
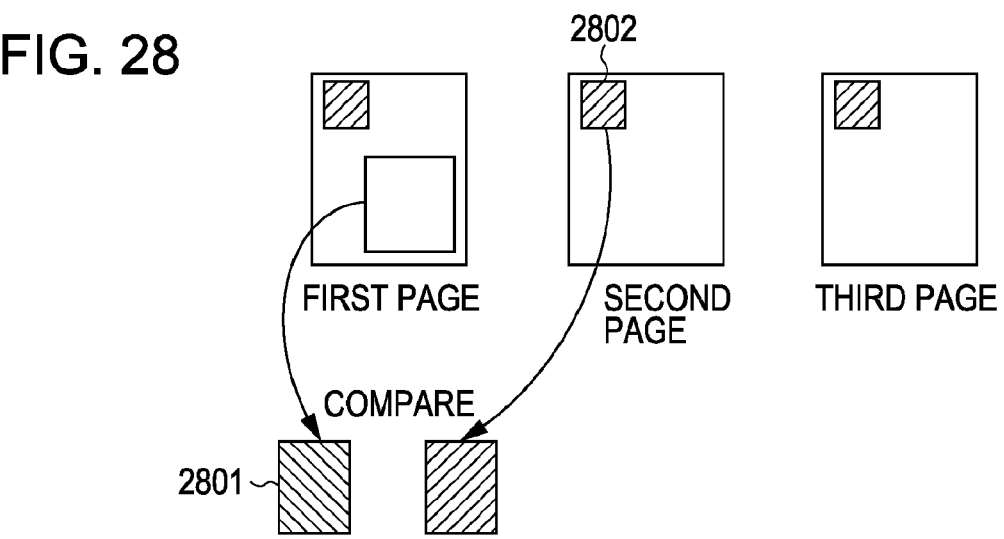
FIG. 28 is illustration 7 of a process according to the fourth embodiment.

In order to solve this problem, this embodiment adopts the following method. That is, only a feature value 2702 of the first page is generated from a predetermined area 2701 and is embedded in the second page, and a feature value of the third page is embedded in an area 2703 different from the predetermined area 2701 (see FIG. 27). With this configuration, the detecting apparatus can recognize that a newly generated feature value 2801 of the first page is equal to a feature value 2802 read from the second page (see FIG. 28).

As described above, in this embodiment, the feature value generation area 2701 is different from the area embedded with feature value 2703 in a page where a feature value is generated first during generation of an originality-guaranteed output (first page in this example). Accordingly, a wrong determination by the detecting apparatus can be prevented.

In this embodiment, an originality-guaranteed output that is less likely to be falsified than in the first and second embodiments is generated. The reason is as follows. If someone wants to falsify an image of the second page, he/she needs to falsify the third page embedded with the feature value of the image of the second page. In order to achieve this, he/she needs to falsify an image embedded in the third page and also needs to falsify an image embedded in the first page that is embedded with the feature value of the image of the third page.

In other words, if someone wants to falsify a page, he/she needs to falsify the page and all of the following pages and the first page, which forces him/her to spend a lot of time and to take a large amount of labor. Therefore, in this embodiment, an originality-guaranteed output that is less likely to be falsified than in the first and second embodiments is generated.

On the other hand, if someone wants to falsify a page in an originality-guaranteed output generated in the first or second embodiment, he/she only has to falsify a page embedded with the feature value of the page, as described in the first embodiment. For this reason, when the embedding method according to this embodiment is adopted, an originality-guaranteed output that is less likely to be falsified is generated. However, this method has a disadvantage that a larger memory is required and a processing speed decreases, because comparison of information needs to be sequentially performed.

Other Embodiments

<Other Apparatuses, Program, and Storage Medium to which the Present Invention can be Applied>

According to the above-described embodiments, the detecting apparatus obtains embedded data and then performs various processes on the basis of the obtained embedded data. However, the present invention is not limited to this. For example, the detecting apparatus may obtain only necessary embedded data at necessary timing. This is described below by using a specific example.

For example, when the page-sort output process is set but no determining process is set in the second embodiment, the detecting apparatus does not need to obtain a feature value. The timing to obtain a feature value may be step S1802 in step S1605, instead of step S1603. This example in which the detecting apparatus may obtain only necessary embedded data at necessary timing can be applied to all of the embodiments.

The present invention can be applied to a system including a plurality of apparatuses (e.g., a computer, an interface apparatus, a reader, and a printer) and to a single apparatus (e.g., a multifunction apparatus, a printer, or a facsimile).

The embodiments of the present invention can be carried out when a computer (or CPU or MPU) of a system or an apparatus reads program code realizing the above-described flowcharts from a storage medium and executes the program code. In that case, the program code read from the storage medium realizes the functions of the above-described embodiments. Therefore, the program code and the storage medium storing the program code are included in the present invention.

Examples of the storage medium to supply the program code include a floppy® disk, a hard disk, an optical disc, a magneto-optical disc, a CD-ROM (compact disc read only memory), a CD-R (compact disc recordable), a magnetic tape, a nonvolatile memory card, and a ROM (read only memory).

The functions of the above-described embodiments can be realized by reading and executing the program code by the computer. Also, the functions of the above-described embodiments can be realized when an OS (operating system) operating on the computer performs part or whole of actual processing on the basis of instructions of the program code.

Furthermore, the program code read from the storage medium may be written in a memory provided in a function expanding board inserted into the computer or a function expanding unit connected to the computer. The functions of the above-described embodiments may be realized when a CPU provided in the function expanding board or the function expanding unit performs part or whole of actual processing on the basis of instructions of the written program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-353756 filed Dec. 7, 2005, which is hereby incorporated by reference herein in its entirety.

What is claimed is:

1. An image processing apparatus comprising:
feature value generating means for generating feature values of given pages of a document including N pages, N being an integer not less than 2;
embedding means for embedding the generated feature values of the given pages in other pages corresponding to respective given pages; and
output means for outputting the document in which the feature values of the given pages have been embedded in the corresponding other pages by the embedding means,
wherein the embedding means embeds a feature value of a k-th page in a j-th page, k being a natural number satisfying $1 \leq k \leq N$ and j being a natural number satisfying $1 \leq j \leq N$ and $j \neq k$,
wherein j is k+1 when $1 \leq k \leq N-1$,
wherein j is 1 when k is N,
wherein the feature value generating means generates feature values of k-th page (k=N) before the feature value generating means generates feature values of k-th page ($1 \leq k \leq N-1$), and
wherein the embedding means embeds a feature value of a k-th page (k=N) in a j-th page before the generating means generates a feature value of the j-th page.

2. The image processing apparatus according to claim 1, wherein the feature value generating means generates feature values of k-th page from k=1 to k=N-1 in succession, and
wherein the embedding means embeds a feature value of a k-th page from k=1 to k=N-1 in a j-th page in succession.

3. The image processing apparatus according to claim 1, wherein the embedding means further embeds a document ID of the document and the number of the given pages and a total number of the document in the other pages corresponding to the respective pages.

4. An image processing apparatus according to claim 1, wherein a region in a page of the given pages from which the feature values are generated is different from a region in the page in which the generated feature values are embeded.

5. An image processing apparatus according to claim 4, wherein the first regions from which the feature values are generated are in common in any given pages.

6. An image processing apparatus according to claim 1, wherein the generated feature values are embedded in a page of the other pages as watermark so as not to change the page.

7. A method for controlling an image processing apparatus, the method comprising:
generating feature values of given pages of a document including N pages, N being an integer not less than 2;

embedding the generated feature values of the given pages in other pages corresponding to respective given pages; and outputting the document in which the feature values of the given pages have been embedded in the corresponding other pages, wherein a feature value of a k-th page in a j-th page is embedded, k being a natural number satisfying $1 \leq k \leq N$ and j being a natural number satisfying $1 \leq j \leq N$ and $j \neq k$, wherein j is k+1 when $1 \leq k \leq N-1$, wherein j is 1 when k is N, wherein feature values of k-th page (k=N) are generated before feature values of k-th page ($1 \leq k \leq N-1$) are generated, and wherein a feature value of a k-th page (k=N) in a j-th page is embedded before a feature value of the j-th page is generated.

8. A method according to claim 7, wherein feature values of k-th page from k=1 to k=N-1 are generated in succession, and wherein feature values of a k-th page from k=1 to k=N-1 in a j-th page are embedded in succession.

9. A method according to claim 7, further comprising:

embedding a document ID of the document and the number of the given pages and a total number of the document in the other pages corresponding to the respective pages.

10. A method for controlling an image processing apparatus according to claim 7, wherein a region in a page of the given pages from which the feature values are generated is different from a region in the page in which the generated feature values are embeded.

11. A method for controlling an image processing apparatus according to claim 10, wherein the first regions from which the feature values are generated are in common in any given pages.

12. A method for controlling an image processing apparatus according to claim 7, wherein the generated feature values are embedded in a page of the other pages as watermark so as not to change the page.

13. A computer-readable medium storing instructions which, when executed by an apparatus, causes the apparatus to perform operations comprising:

generating feature values of given pages of a document including N pages, N being an integer not less than 2;

embedding the generated feature values of the given pages in other pages corresponding to respective given pages; and outputting the document in which the feature values of the given pages have been embedded in the corresponding other pages, wherein a feature value of a k-th page in a j-th page is embedded, k being a natural number satisfying $1 \leq k \leq N$ and j being a natural number satisfying $1 \leq j \leq N$ and $j \neq k$, wherein j is k+1 when $1 \leq k \leq N-1$, wherein j is 1 when k is N, wherein feature values of k-th page (k=N) are generated before feature values of k-th page ($1 \leq k \leq N-1$) are generated, and wherein a feature value of a k-th page (k=N) in a j-th page is embedded before a feature value of the j-th page is generated.

14. A computer-readable medium according to claim 13, wherein feature values of k-th page from k=1 to k=N-1 are generated in succession, and wherein feature values of a k-th page from k=1 to k=N-1 in a j-th page are embedded in succession.

15. A computer-readable medium according to claim 13, wherein the operations further comprise:

embedding a document ID of the document and the number of the given pages and a total number of the document in the other pages corresponding to the respective pages.

16. A computer-readable medium according to claim 13, wherein a region in a page of the given pages from which the feature values are generated is different from a region in the page in which the generated feature values are embeded.

17. A computer-readable medium according to claim 16, wherein the first regions from which the feature values are generated are in common in any given pages.

18. A computer-readable medium according to claim 13, wherein the generated feature values are embedded in a page of the other pages as watermark so as not to change the page.

* * * * *